United States Patent
Muruganathan et al.

(10) Patent No.: US 8,848,560 B2
(45) Date of Patent: Sep. 30, 2014

(54) APPARATUS AND METHOD FOR ADAPTIVE TRANSMISSION DURING ALMOST BLANK SUBFRAMES IN A WIRELESS COMMUNICATION NETWORK

(75) Inventors: Siva Dharshan Muruganathan, Stittsville (CA); Robert Novak, Stittsville (CA); Tarik Tabet, Montreal (CA); William Anthony Gage, Stittsville (CA); Biswaroop Mukherjee, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 149 days.

(21) Appl. No.: 13/364,874

(22) Filed: Feb. 2, 2012

(65) Prior Publication Data

US 2013/0114434 A1 May 9, 2013

Related U.S. Application Data

(60) Provisional application No. 61/555,557, filed on Nov. 4, 2011.

(51) Int. Cl.
*H04J 1/16* (2006.01)
*H04W 16/14* (2009.01)
*H04W 84/04* (2009.01)

(52) U.S. Cl.
CPC ............ *H04W 16/14* (2013.01); *H04W 84/045* (2013.01)
USPC ......................................................... 370/252

(58) Field of Classification Search
USPC ........... 370/252, 329, 332, 322; 455/444, 450
See application file for complete search history.

(56) References Cited

U.S. PATENT DOCUMENTS

| | | | |
|---|---|---|---|
| 2009/0291690 A1* | 11/2009 | Guvenc et al. | 455/444 |
| 2011/0085448 A1 | 4/2011 | Kuwahara | |
| 2011/0141987 A1* | 6/2011 | Nam et al. | 370/329 |
| 2012/0044818 A1* | 2/2012 | Lindoff et al. | 370/252 |
| 2012/0113844 A1* | 5/2012 | Krishnamurthy | 370/252 |

(Continued)

FOREIGN PATENT DOCUMENTS

| WO | 2009142954 A1 | 11/2009 | |
|---|---|---|---|
| WO | WO 2009142954 A1 * | 11/2009 | ............ H04W 16/10 |

OTHER PUBLICATIONS

European Extended Search Report; Application No. 12191165.5; Feb. 27, 2013; 7 pages.

(Continued)

*Primary Examiner* — Chirag Shah
*Assistant Examiner* — Jael Ulysse
(74) *Attorney, Agent, or Firm* — Conley Rose, P.C.; J. Robert Brown, Jr.

(57) ABSTRACT

A system and method for communication in a wireless communication network are disclosed. One embodiment of the system includes an overlay access node that supports Almost Blank Subframes (ABSs). The overlay access node, such as macro eNB, can receive measurement results from one or more user equipments, including macro user equipments (UEs) and/or pico (UEs), either directly or via an underlay access node, such as a pico eNB. The macro eNB can determine a set of macro UEs that are sufficiently close to the macro eNB for transmission during ABSs with a low transmission power or beamforming without significant interference to the pico UEs. This scheme improves the throughput of transmission between the macro eNB and macro UEs while reducing interference to the pico UEs.

21 Claims, 13 Drawing Sheets

(56) References Cited

U.S. PATENT DOCUMENTS

| | | | | |
|---|---|---|---|---|
| 2012/0113846 | A1* | 5/2012 | Narasimha et al. | 370/252 |
| 2012/0113847 | A1* | 5/2012 | Narasimha et al. | 370/252 |
| 2012/0113961 | A1* | 5/2012 | Krishnamurthy | 370/332 |
| 2013/0033998 | A1* | 2/2013 | Seo et al. | 370/252 |
| 2013/0225188 | A1* | 8/2013 | Seo et al. | 455/450 |

OTHER PUBLICATIONS

3GPP TSG RAN WG3 #70 Meeting; "Almost Blank Subframe Request from Pico to Marco eNB"; R3-103336; Jacksonville, U.S.; Nov. 15-19, 2010; 2 pages.

3GPP TSG RAN WG1 Meeting #60bis; "Interference Coordination for Non-CA-based Heterogeneous Networks"; R1-102307; Beijing, China; Apr. 12-16, 2010; 11 pages.

3GPP TS 36.300 V10.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 10; Dec. 2010; 200 pages.

3GPP TS 36.213 V10.1.0; 3rd Generation Partnership Project; Technical Specification Group Radio Access Network; Evolved Universal Terrestrial Radio Access (E-UTRA); Physical Layer Procedures; Release 10; Mar. 2011; 115 pages.

3GPP TS 36.331 V10.1.0; 3rd Generation Partnership Project; Technical Specification Group Radio Access Network; Evolved Universal Terrestrial Radio Access (E-UTRA); Radio Resource Control (RRC); Protocol Specification; Release 10; Mar. 2011; 290 pages.

3GPP TS 36.133 V10.3.0; 3rd Generation Partnership Project; Technical Specification Group Radio Access Network; Evolved Universal Terrestrial Radio Access Network (E-UTRA); Requirements for Support of Radio Resource Management; Release 10; Jun. 2011; 457 pages.

* cited by examiner

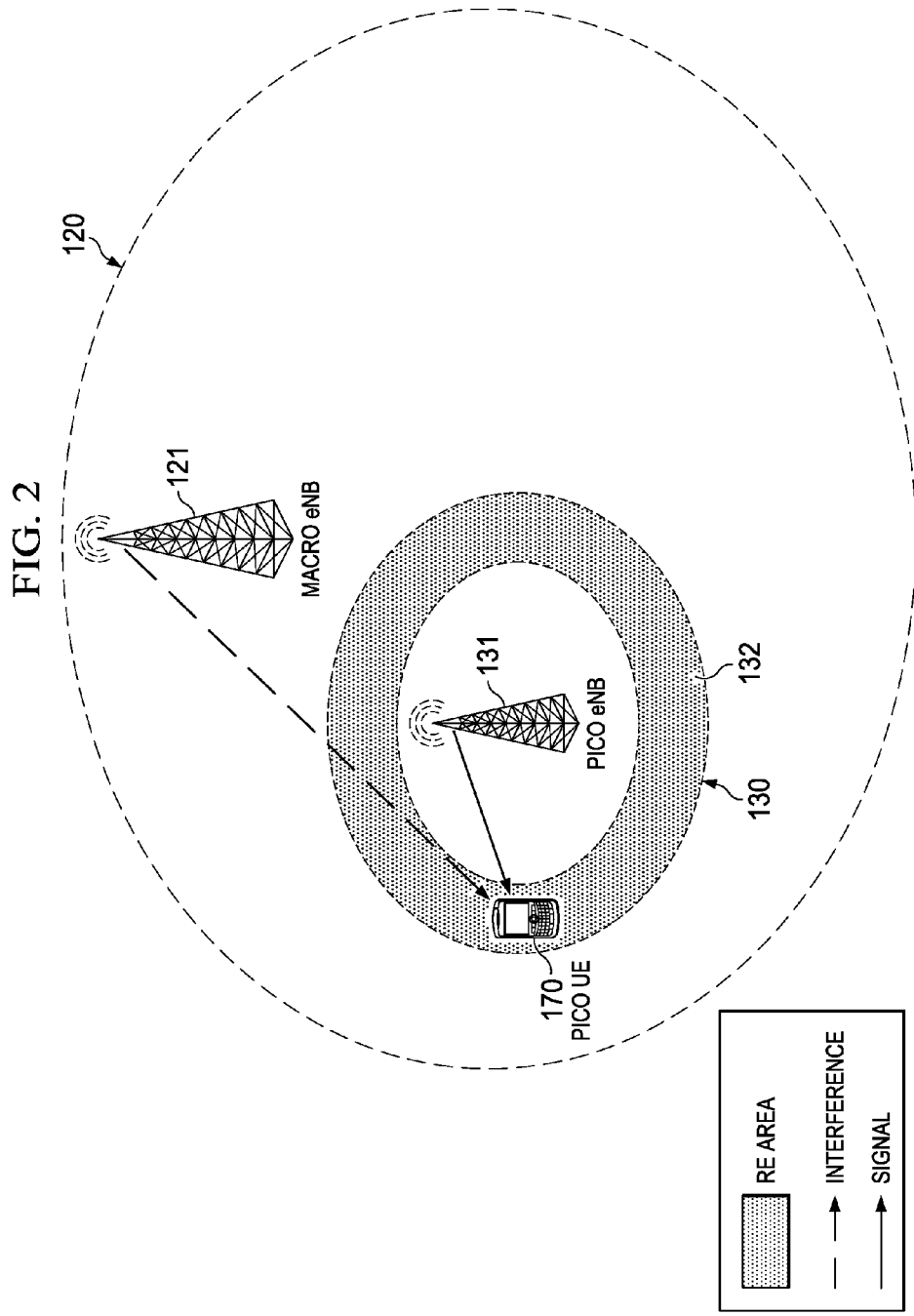

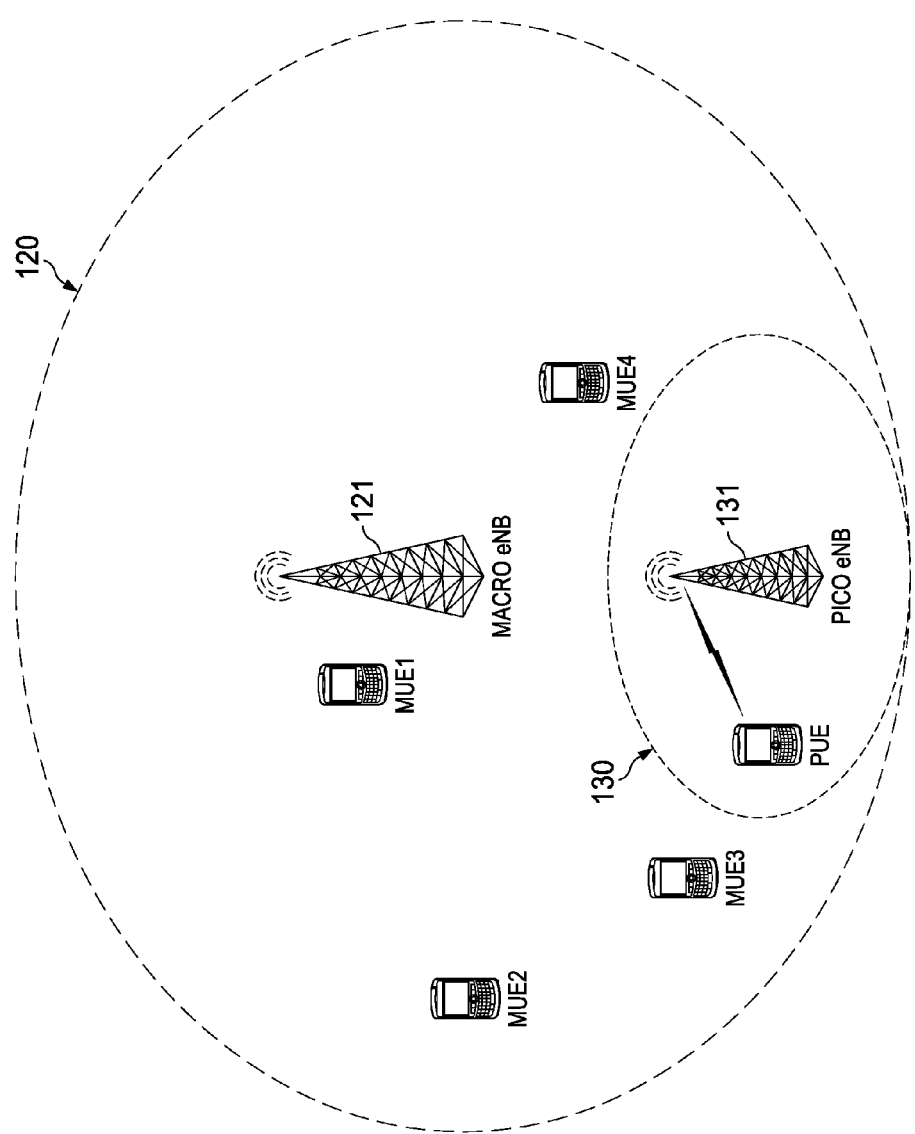

APPARATUS AND METHOD FOR ADAPTIVE TRANSMISSION DURING ALMOST BLANK SUBFRAMES IN A WIRELESS COMMUNICATION NETWORK

CROSS-REFERENCE TO RELATED APPLICATIONS

This application claims the benefit under 35 U.S.C. §119 (e) of U.S. Provisional Patent Application No. 61/555,557, filed Nov. 4, 2011, the disclosure of which is incorporated herein by reference in its entirety.

BACKGROUND

1. Field

The present disclosure relates to wireless communication systems, and in particular, to adaptive transmission during almost blank subframes (ABSs) in a wireless communication system.

2. Description of the Related Technology

Recently, there has been a significant progress in wireless technologies, especially in mobile telecommunication technologies. The Second Generation technology, also known as "Global System for Mobile Communications (GSM)" and the Third Generation (3G) technology have been commercially deployed successfully to provide voice, text, and data services for mobile communication devices.

Advanced mobile communication technologies have been developed to provide better mobile communication services than the previous technologies. Among them is the Long Term Evolution of Universal Mobile Telecommunications System (UMTS), which is known as "LTE." The LTE system has been developed as part of the 3rd Generation Partnership Project (3GPP), which is one of standards development groups for mobile radio systems. Details of the LTE system have been published or proposed in 3GPP LTE Releases 8 to 11. 3GPP LTE Releases 8 to 11 and beyond can be collectively referred to as "LTE" in the context of this document. 3GPP Releases 10, 11 and later releases are collectively referred to as "LTE Advanced" (LTE-A), and propose more advanced features than 3GPP Release 9 or earlier. As used herein, the term "legacy" or "legacy device" can refer to signals, user equipments, network components, and/or other entities that comply with 3GPP Release 9 or earlier release, but do not comply with LTE Advanced.

In LTE Advanced, various new features have been introduced. Among them is a heterogeneous network that includes different types of network access nodes or devices to provide a better coverage for mobile devices than a homogeneous network (which includes the same type of access nodes). However, due to the co-existence of different types of network access nodes within a single wireless network, interference problems between various mobile devices and access nodes have been identified, and various schemes have been proposed to resolve such problems. One of such schemes is the use of Almost Blank Subframes (ABSs), which will be described later in detail. However, the use of ABS reduces the throughput of a wireless communication system, and thus there is a need for a scheme that can increase the throughput while reducing interference in the context of ABS.

BRIEF DESCRIPTION OF THE DRAWINGS

FIG. 2 is a schematic diagram illustrating interference from a macro eNB to a user equipment (UE) served by a pico eNB in the network of FIG. 1.

FIG. 4 is a schematic diagram of a heterogeneous wireless communication network having macro and pico user equipments according to some embodiments.

DETAILED DESCRIPTION

Figure 1:
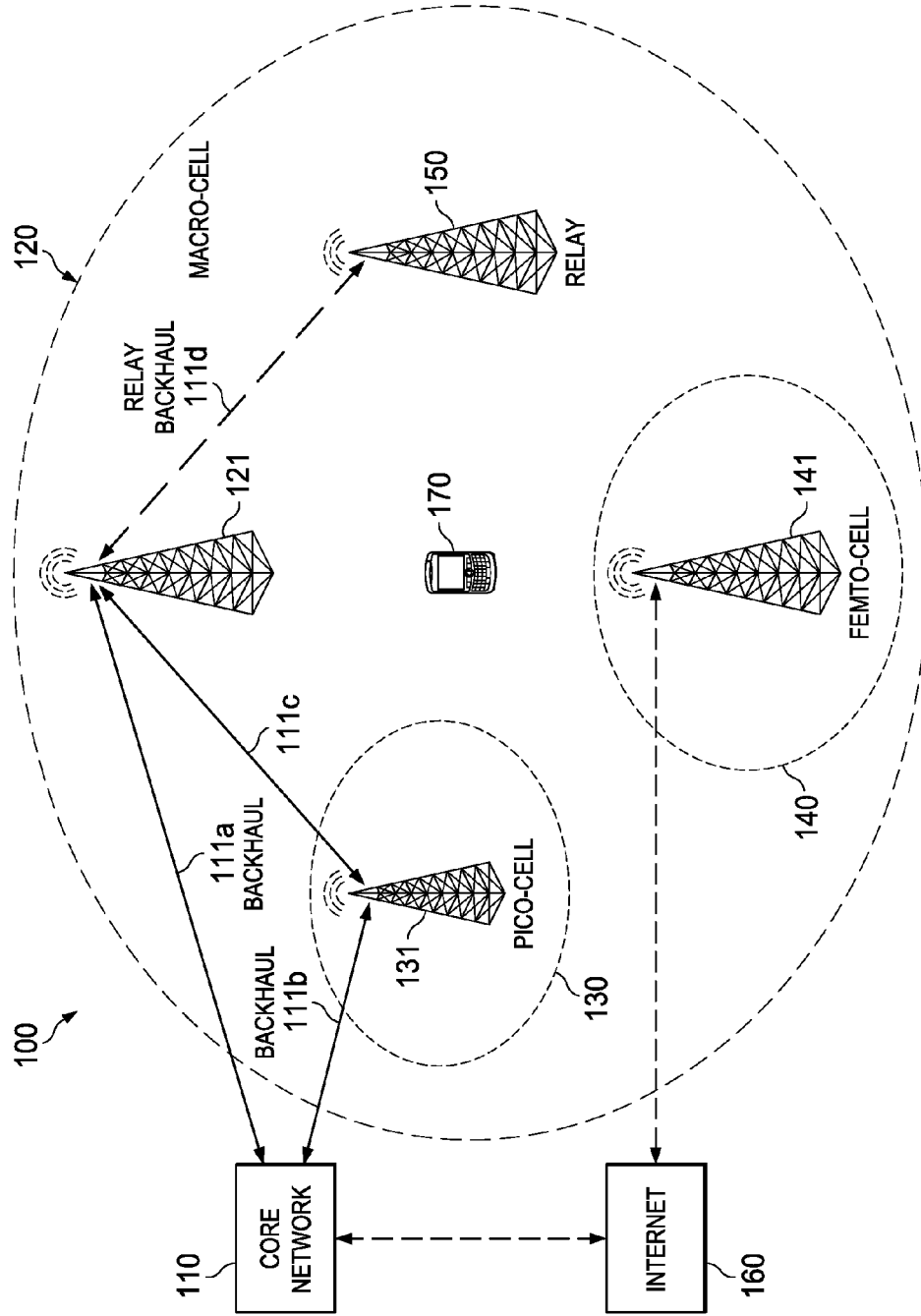
FIG. 1 is a schematic diagram illustrating a heterogeneous wireless communication network according to one embodiment.

The following detailed description presents various embodiments of the present disclosure. However, the present disclosure is intended to provide a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the inventions herein described.

Embodiments are described herein in the context of an LTE wireless network or system, but can be adapted for other wireless networks or systems. The LTE wireless network described herein is generally in compliance with 3GPP LTE standard, including, but not limited to, Releases 8 to 11 and beyond.

Overview of Wireless Heterogeneous Network

Referring to FIG. 1, a heterogeneous wireless communication network according to one embodiment will be described below. The term "heterogeneous wireless communication network" or "heterogeneous network" can also be referred to as a "Hetnet."

The illustrated heterogeneous network 100 includes a core network 110 and a macro cell or overlay cell 120. The term "cell" or "wireless cell" generally refers to an area of coverage of wireless transmission by a network or network component, such as an access node. The core network 110 can be connected to the Internet 160.

In the illustrated embodiment, the macro cell 120 can include at least one base station. The term "base station" can be interchangeably used with a network node, an access node, or a network component. Two or more base stations may operate on the same radio frequency or on different radio frequencies.

The base station can be an overlay access node 121 connected to the core network 110 via a backhaul link 111a, including optical fiber or cable. The term "overly access node" generally refers to a network element or component that at least partly serves to form a wireless cell. In one embodiment in which the network 100 is an LTE network, the overlay access node 121 can be an evolved Universal Terrestrial Radio Access Network (UTRAN) node B or "eNB" which is part of an EUTRAN. An eNB that forms an overlay access node of a macro cell can be generally referred to as a "macro eNB." In the context of this document, the term "eNB" can be interchangeably used with an "evolved node B" or an "enhanced node B."

The network 100 can also include one or more underlay cells, for example, a pico cell 130 and a femto cell 140. The underlay cells can have a coverage at least partially overlapping with the coverage of the macro cell 120. The term "underlay cell" is described herein in the context of the LTE standard. However, a skilled artisan will appreciate that other wireless standards can also have components similar to underlay cells, and that the embodiments described herein can be adapted for such standards. Although FIG. 1 illustrates only one pico cell and only one femto cell, the network 100 can include more or less of such cells. The underlay cells 130, 140 have a smaller coverage than the overlay cell 120. Access nodes 131, 141 forming the underlay cells 130, 140 can use a lower transmission power than that of the overlay access node 121.

The pico cell 130 can include a pico eNB 131 connected to the core network 110 via a backhaul link 111b, and to the macro eNB 121 via a backhaul link 111c. The backhaul links 111b and 111c may include cable, fiber or wireless links. In one embodiment, the pico eNB 131 can have a transmission power that is, for example, about 30 dBm, which is about 13 dB lower than that of the macro eNB 121.

The femto cell 140 can include a femto eNB 141 connected to the core network 110 via the Internet 160 via a wired or wireless connection. The femto cell 140 is a subscription based cell, and can be referred to as a closed subscription group (CSG) cell. The term "closed subscription group (CSG)" can be interchangeably used with closed subscriber group. The term "femto eNB" can also be referred to as a "home eNB (HeNB)." In such an instance, the macro eNB 121 can be referred to as a source eNB. In one embodiment, the femto eNB 141 can have a transmission power that is, for example, about 20 dBm, which is about 23 dB lower than that of the macro eNB 121.

The network 100 can also include a relay node 150 which serves to wirelessly relay data and/or control information between the macro eNB 121 and a user equipment (UE) 170. The macro eNB 121 and the relay node 150 can be connected to each other via a wireless back haul link 111d. In such an instance, the macro eNB 121 can be referred to as a donor eNB. In one embodiment, the relay node 150 can have a transmission power that is, for example, about 30 or 37 dBm, which is about 13 dB or 6 dB lower than that of the macro eNB 121. In the context of this document, the term "underlay access node" generally refers to pico eNBs, femto eNBs, and/or relay nodes, without being limited thereto.

The user equipment 170 can communicate wirelessly with any one of the overlay access node 121 or the underlay access nodes 131, 141, 150, depending on the location or the existence of subscription in the case of the femto cell 140. The term "user equipment" (alternatively "UE") can refer to various devices with telecommunications capabilities, such as mobile devices and network appliances.

Examples of user equipments include, but are not limited to, a mobile phone, a smart phone, a telephone, a television, a remote controller, a set-top box, a computer monitor, a computer (including a tablet computer such as BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, a game device, etc. Such a UE might include a device and its associated removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

In certain embodiments, the network 100 can support Multimedia Broadcast Multicast Services (MBMS), and can form at least part of a MBMS Single Frequency Network (MBSFN).

Almost Blank Subframes

Referring to FIG. 2, interference that may occur in a heterogeneous network will be described below. FIG. 2 illustrates a part of FIG. 1, which includes the macro cell 120 including the macro eNB 121, and the pico cell 130 including the pico eNB 131. In order to increase the service area of the pico cell 130, a biased handover offset value can be applied for handover such that more UEs are associated with the pico cell 130. Therefore, the pico cell range is effectively increased. Such an increased range is known as a cell range expansion (RE) area (or CRE area) 132. The term "cell range expansion area" generally refers to an expansion area from the edge of a normal pico cell. In the CRE area, transmission from the pico eNB 131 can be received by a UE at a lower power level than within the normal pico cell, and the DE can experience relatively high interference from the macro cell.

When the UE 170 is within the coverage of the pico cell 130, it can be attached to or associated with the pico cell 130, and can communicate with the pico eNB 131. In the context of this document, such a DE can be referred to as a pico UE. On the other hand, a DE attached to or associated with a macro eNB can be referred to as a macro UE. A single UE can be either a macro UE or a pico DE, depending on whether it is attached to the macro eNB or pico eNB.

As shown in FIG. 2, the pico UE 170 is also within the coverage of the macro eNB 121, and thus can be affected by transmission of signals from the macro eNB 121. As the pico eNB 131 can use a lower transmission power than that of the macro eNB 121, the pico UE 170 can be subjected to interference by unwanted signals from the macro eNB 121. The interference can be also due to an overlap of the coverage of the two eNBs (macro and pico eNBs). Such interference can be referred to as inter-cell interference. A similar problem can also occur in the case of the femto cell 140 or the relay node 150.

Figure 3A:
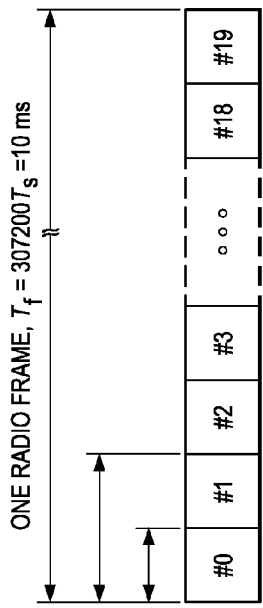
FIG. 3A is a schematic timing diagram illustrating a conventional radio frame structure of an LTE system.

In order to reduce such interference, the LTE has introduced inter-cell interference coordination (ICIC). For the time domain ICIC, subframe utilization across different cells are coordinated in time through backhaul signaling of so-called Almost Blank Subframe (ABS) patterns. See, e.g., 3GPP TS 36.300 v10.2.0, "Evolved Universal Terrestrial Radio Access (E-UTRA) and Evolved Universal Terrestrial Radio Access Network (E-UTRAN); Overall description; Stage 2 (Release 10)," Section 16.1.5, March 2011. As shown in FIG. 3A, the LTE defines a radio frame (10 milliseconds (ms)) to include 10 subframes, each of which is 1 ms long. Each of the subframes includes two slots, each of which is 0.5 ms long.

Figure 3B:
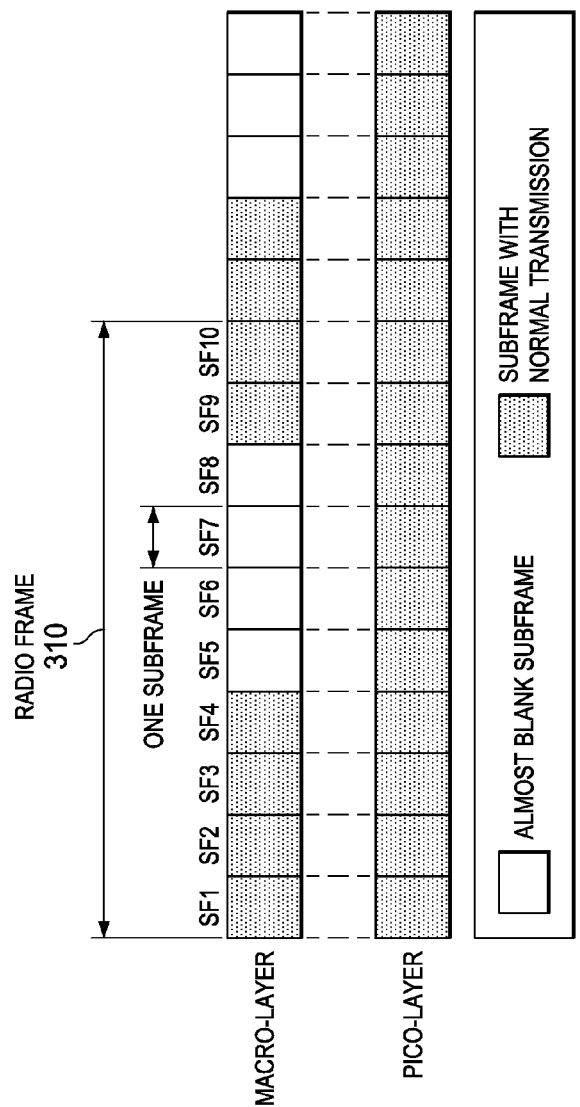
FIG. 3B is a schematic timing diagram of a conventional LTE radio frame structure having Almost Blank Subframes (ABS).

3GPP TS 36.300 v10.2.0, section 16.1.5 describes that the Almost Blank Subframes (ABSs) in an aggressor cell are used to protect resources in subframes in the victim cell receiving strong inter-cell interference. Almost Blank Subframes are defined as subframes with reduced transmit power (including no transmission) on some physical channels and/or reduced activity. To ensure backward compatibility towards legacy UEs, the macro eNB can transmit legacy compatible necessary control channels (for example, reference symbols) and physical signals as well as system information during ABSs. FIG. 3B shows one example of ABS pattern. In the illustrated example, a radio frame 310 can include first to tenth subframes SF1-SF10. The fifth to eighth subframes SF5 to SF8 can be designated as ABSs by the macro eNB 121, as shown in FIG. 3B although other subframes can also be ABSs. The macro eNB 121 does not communicate data during the ABSs while the pico 131 eNB is allowed to communicate with the pico DE 170 and/or other pico UEs during the ABSs. This scheme allows the pico UE 170 or other pico UEs to have reduced interference from the macro eNB 121 during the ABSs.

Adaptive Transmission During Almost Blank Subframes

The use of ABS can reduce interference to pico UEs from a macro eNB, as described above in connection with FIG. 3B. However, as the macro eNB does not utilize the subframes designated as ABSs to transmit data, it has a lower throughput than when it does not use an ABS scheme. Thus, it would be beneficial to increase the throughput of the macro eNB when using ABS while reducing interference to pico UEs or without increasing such interference.

In some embodiments, a macro eNB in a wireless network (such as a heterogeneous network) can transmit data and/or control information during one or more ABSs to a selected set of macro UEs among macro UEs attached to the macro eNB. The transmission from the macro eNB during ABSs can use a transmission power level lower than a regular or normal transmission power level used during non-ABS subframes. Alternatively, the transmission from the macro eNB during ABSs can use a beamforming technology to generate one or more directional beams or transmissions such that the transmission is not directed towards pico UEs. The directional transmissions can include, for example, spatial multiplexing mechanisms for beamforming, switched beams, or antenna nulling.

The embodiments are described herein in the context of using ABSs, as defined in the LTE, but a skilled artisan will readily appreciate that the embodiments can be adapted for any other wireless networks or systems using a scheme similar to the ABS of the LTE.

Referring to FIG. 4, a set of macro UEs can be selected by the macro eNB 121, based on various measurements and/or parameters obtained from macro UEs, MUE1-MUE4, and/or pico UEs, RUE. FIG. 4 shows the macro cell 120 with the macro eNB 121, and the pico cell 130 with the pico eNB 131. For example, a number of UEs, including first to fourth macro UEs, MUE1-MUE4, and a pico UE, PUE, can be located within the macro cell 120. The pico UE, RUE, is also within the coverage of the pico cell 130. The first macro UE, MUE1, is located substantially closer to the macro eNB 121 than the pico eNB 131 while the third and fourth macro UEs, MUE3, MUE4 are close to the pico cell 130. The second macro UE, MUE2, is near the edge of the macro cell 120, and is also far from the pico cell 130.

In this situation, the macro eNB 121 can communicate with the first macro UE, MUE1, during ABSs, using a lower transmission power than the normal transmission power without interfering significantly with the pico UE, PUE. On the other hand, the macro eNB 121 may not be able to communicate with the second, third, or fourth macro UEs, MUE2-MUE4, using the same lower power as used for the first macro UE, MUE1, due to the distance and/or location. In such a case, the macro eNB 121 can optionally use beamforming. In one embodiment, the macro eNB 121 can determine a set of macro UEs for transmission during ABSs and transmission power level (or beamforming details), using some information or measurements indicative of the locations of the macro UEs and/or relative transmission strengths of the macro eNB and pico eNB at a given location, as will be described later in detail. In some embodiments, such determination by the macro eNB can be made adaptively or repeatedly.

Figure 5:
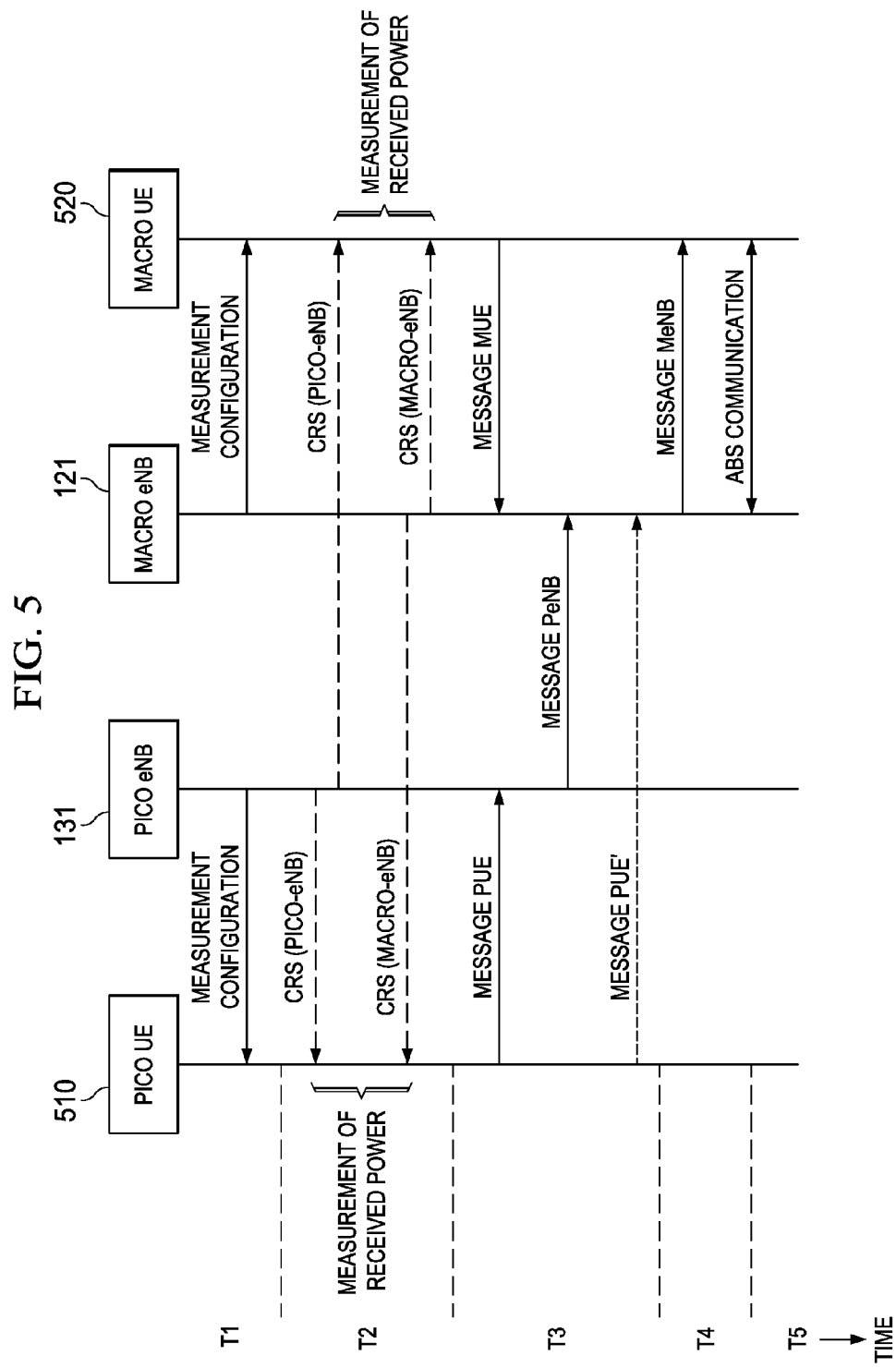
FIG. 5 is a schematic timing diagram illustrating signal or message transmissions among access nodes and user equipments according to some embodiments.

Referring to FIG. 5, a method of transmission by a macro eNB during one or more ABSs according to one embodiment will be described below. In the illustrated embodiment, a heterogeneous network includes a macro eNB 121, a pico eNB 131, a pico DE 510, and a macro UE 520. Although FIG. 5 shows only one pico eNB, only one pico UE, and only one macro UE, the network can include multiple pico eNBs, multiple pico UEs and/or multiple macro UEs. In FIG. 5, the vertical axis represents time, and the horizontal axis represents directions of signals. The embodiment is described herein with respect to a macro eNB and a pico eNB, but a skilled artisan will appreciate that the embodiment can be adapted for other combinations of an overlay access node and an underlay access node(s) (such as a femto eNB or a relay node).

During a first time window T1, one or more of the macro eNB 121 or pico eNB 131 provide measurement configurations to UEs, such as the pico DE 510 and macro UE 520. The measurement configurations can be transmitted from the eNBs 121, 131 to the UEs 510, 520, using, for example, radio resource control (RRC) signaling. The RRC signaling from the macro eNB 121 and pico eNB 131 can be performed at different times or simultaneously within the time window T1.

During a second time window T2, the eNBs 121, 131 can transmit signals that can be used for power measurements by the UEs 510, 520, and the UEs 510, 520 can measure power based at least partly on the signals. The signals can be transmitted at different times or simultaneously within the second time window T2. In one embodiment, the signals can be reference signals including, for example, a cell-specific reference symbol (CRS) (which can be transmitted at every subframe in the LTE network). The pico DE 510 can measure signal strengths or power of one or more CRSs from the pico eNB 131 and/or macro eNB 121. Similarly, the macro UE 520 can measure signal strengths or power of one or more CRSs from the pico eNB 131 and/or macro eNB 121 during the second time window T2. In one embodiment, the UEs 510, 520 can measure or detect Reference Signal Received Power (RSRP) and/or Reference Signal Received Quality (RSRQ), as defined in the LTE network.

During a third time window T3, the UEs 510, 520 can send information indicative of measurement results to the macro eNB 121. In one embodiment, the pico UE 510 can send a message (Message PUE) to the pico eNB 131, to indicate measurement results. The messages described herein can include at least part of a measurement report in the context of the LTE. The pico eNB 131 can process the measurement results from the pico UE 510. Then, the pico eNB 131 can transmit a message (Message PeNB) to the macro eNB 121 via a backhaul link to provide information on the measurement results. In an alternative embodiment, the pico UE 510 can send an alternative message (Message PUE') directly to the macro eNB 121 via a wireless connection. In certain embodiments, during the third time window T3, the macro UE 520 can also send a message (Message MUE) directly to the macro eNB 121 via a wireless connection using, for example, RRC signaling.

During a fourth time window T4, the macro eNB 121 can select one or more macro UEs for transmission during one or more ABSs, and determine a transmission power level (which is lower than a regular non-ABS transmission power level), or alternatively beamforming details or parameters. Then, the macro eNB 121 can send a message (Message MeNB) to the macro UEs (for example, the macro UE 520) that have been selected for transmission during the ABSs. The Message MeNB can include control information for the transmission during the ABSs.

During a fifth time window T5, the macro eNB 121 and the selected macro UE 520 can communicate data and/or control information during ABSs. The communication can be performed, using either a transmission power level or beamforming details determined during the fourth time window T4. The above described steps can be repeated as needed so that the transmission during ABSs can be adaptively changed according to the changes in the network, for example, change in the location of the macro UE 510. Other details of the adaptive transmission during ABS according to embodiments will be described later.

In an alternative embodiment, the macro eNB can receive location information (for example, global positioning system (GPS)-based location information), or information from which the location may be derived (for example, wireless access node locations or other reference points), from macro UEs, and select one or more macro UEs for transmission during ABSs. A skilled artisan will appreciate that various techniques can be used for obtaining and providing such location information of macro UEs. In such an embodiment, the macro eNB can have (1) a predetermined range(s) and/or direction(s) and (2) predetermined corresponding transmission power level(s) and/or beamforming details. The macro eNB can use the predetermined corresponding transmission power level and/or beamforming details for transmission during ABSs, based on the location information from the macro UEs. Such an eNB can also use this scheme either in conjunction with the embodiment described above or as a stand-alone scheme (i.e., without using power measurement results from UEs).

In yet another embodiment, the macro eNB can receive Channel State Information (CSI) and/or Channel Quality Indicator (CQI) from macro UEs, and determine one or more macro UEs for low power transmission during ABSs, based on the CSI and/or CQI feedback. In some examples, the CSI can be restricted to the ABSs.

1. Operations at Macro eNB

Figure 6:
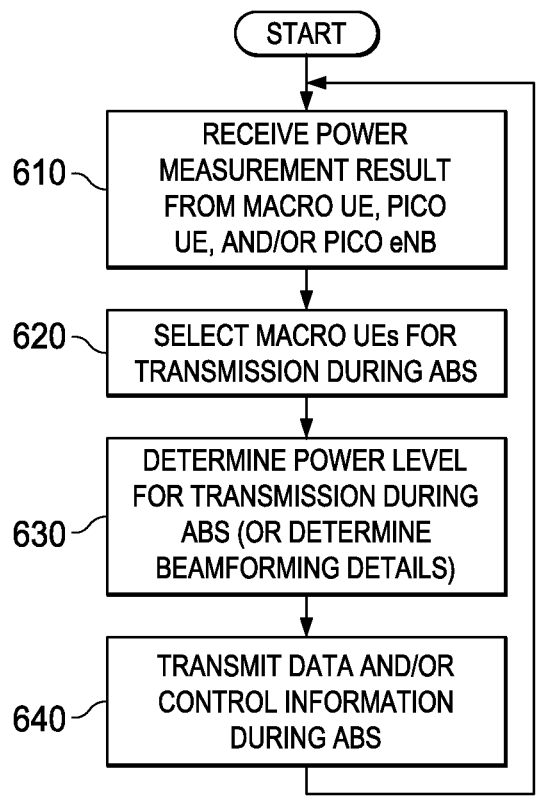
FIG. 6 is a flowchart illustrating a method of operating a macro eNB according to one embodiment.

Referring to FIG. 6, a method of operating a macro eNB in a wireless network according to one embodiment will be described below. The macro eNB can be, for example, the macro eNB 121 described above in connection with FIG. 1, 2, 4, or 5, and can form a macro cell.

At a block 610, the macro eNB can receive one or more power measurement results from one or more macro UEs (for example, one or more of the macro UEs MUE1-MUE4 of FIG. 4 or the macro DE 520 of FIG. 5), one or more pico UEs (for example, a pico UE PUE of FIG. 4 or the pico DE 510 of FIG. 5), and/or one or more pico eNBs (for example, a pico eNB 131 of FIG. 4 or 5). The pico eNBs can form pico cells at least partially overlapping with the macro cell. The power measurement results can be in various forms, as will be described later in detail.

In one embodiment, the power measurement results can be in a form of an indication represented in one or more bits. The indication can be indicative of one or more of power measurement results obtained from multiple UEs in the network. The indication may or may not indicate actual numerical values of the measurement results.

In some embodiments, the power measurement results can include certain numerical values obtained from one or more UEs in the network. In such embodiments, the power measurement results can include Reference Signal Received Power (RSRP) and/or Reference Signal Received Quality (RSRQ) reports, as defined in the LTE standard. The macro eNB can receive RSRP and/or RSRQ reports from one or more pico UEs within the macro cell's coverage area. Upon receiving the reports, the macro eNB can determine one or more path loss values between the macro eNB and the pico UEs. At least partly based on the values, the macro eNB can identify a pico DE with the smallest path loss (in other words, a pico DE that reported the maximum received macro cell power).

In certain embodiments, the UEs can also provide the macro eNB with information on the location of the UEs. Such information can also be used for determining beamforming details.

At a block 620, the macro eNB can select one or more of macro UEs in the network for communication during ABSs. The macro eNB can select the macro UEs based at least partly on the measurement results received at the block 610. The macro eNB can process the power measurement results to determine, for example, whether a specific macro UE can communicate during ABSs with the macro eNB at a lower power than a regular transmission power while not interfering with a communication between the pico DE and pico eNB. Alternatively, the measurement results can be used for determining a location of a macro DE for transmission using beamforming during ABSs.

In one embodiment, the macro eNB can categorize macro UEs into two groups: (1) a first group including macro UEs that are suitable for communication during ABS, and (2) a second group including macro UEs that are not suitable for communication during ABS. The categorization can be based at least partly on the results of the power measurements by the macro UEs and/or pico UEs. The power measurements can include, for example, (1) signal strength measurements by the macro UEs of the macro cell and the neighboring pico cells (hereinafter "macro DE measurement reports"), and/or (2) signal strength measurements by pico UEs of the macro cell (hereinafter "pico DE measurement reports").

In one implementation, the macro eNB can compare the relative strengths of the neighboring pico cell RSRPs to the macro cell RSRPs reported by the macro UEs. Using such comparisons and the pico UE measurement reports, the macro eNB can choose the maximum number of macro UEs that can receive low power transmission during ABSs while reducing or avoiding interference to pico UEs from the macro eNB. In an alternative implementation, the macro eNB can use results from RSRP and RSRQ measurement by macro UEs during ABSs to determine these candidates.

In another alternative implementation, estimates of the path loss between the neighboring pico eNBs and the macro UEs can be used by the macro eNB (along with the pico DE measurement reports) in determining macro UEs that support low power transmission on physical downlink control channel and/or physical downlink shared channel (hereinafter, "lower power PDCCH/PDSCH") during ABS while reducing or avoiding interference to a macro UE from the pico eNBs.

In yet another alternative implementation, the pico-cell power to macro-cell power ratio can be reported to the macro eNB by the macro UE. The reported ratio can be compared to a Power Level Ratio Threshold (PLRT) value at the macro eNB to identify macro UEs that can be served by the macro eNB during ABSs.

In yet another alternative implementation, the macro DE can compare the pico-cell to macro-cell power ratio to the PLRT, and report a binary indicator value to the macro eNB. This binary indicator can be utilized by the macro eNB to identify macro UEs that may be served by the macro eNB during ABSs.

In some alternative implementations, the macro eNB can identify macro UEs that are located at least a selected distance away from one or more pico eNBs and can be served with beamformed transmissions during ABSs while reducing or avoiding interference to pico UEs from the macro eNB.

At a block 630, the macro eNB can determine a power level for transmission between the macro eNB and one or more of the selected macro UEs during ABSs. The macro eNB can use the power measurement results to determine the power level which is lower than the regular or normal transmission power level during non-ABS subframes. In an embodiment in which the normal transmission power level is about 46 dBm, the transmission power level during ABSs can be reduced, for example, by a factor of about 3 to about 30 dB.

In one embodiment, after determining the power level, the macro eNB can send a signaling (such as the Message MeNB of FIG. 5) to inform the selected macro UEs of the selection and/or the power level (or beamforming details or parameters) for transmission during ABSs.

In one embodiment, a parameter called "Maximum ABS Low-Power Setting (MALPS)" for the macro eNB can be initially derived from the smallest path loss to a pico UE, and an estimated value $\chi$ of the acceptable interference at the pico UE and a margin to account for measurement inaccuracies and uncertainties. Alternatively, the MALPS for the macro eNB can be derived from a minimum relative difference between received signal powers. If no pico UE measurement is available, a default value for MALPS can be used.

At a block 640, the macro eNB can transmit data and/or control information during ABSs to one or more of the selected macro UEs, depending on the needs. The data can include any type of data, including, but not limited to, multimedia data (such as video, music, web data, and the like). The control information can include, for example, information on scheduling decisions (which are required for reception of data), or scheduling grants (which enable transmissions on the uplink).

After the step at the block 640 is completed, the macro eNB can return to the block 610 to repeat the entire process to adjust the selection of macro UEs and/or power levels. In certain embodiments, the macro cell can adjust the MALPS and PLRT on an ongoing basis. The MALPS setting can be varied according to: a macro cell low power level monitoring mechanism or alternatively the pico UEs' reports of the received low-power ABS transmissions, which will be described later in detail. The MALPS setting can also be varied according to any change in the distribution of the pico UEs within the pico cell(s) due to load balancing as the macro cell tries to offload more or less UEs to the pico cell. In some alternative embodiments, the PLRT may be varied according to the performance of macro UEs being served by low-power transmissions from the macro eNB based on channel quality indicator (CQI). These adaptive processes can facilitate reduction of interference and increase in the throughput, particularly when the selected macro UEs are mobile devices. Further details of the method of FIG. 6 will be described below.

2. Power Estimation by Pico UEs

In some embodiments, the received power measurement estimation corresponding to the macro eNB can be provided by one or more pico UEs. The macro eNB can derive its interference to the pico UEs, using one or more reports from the pico UEs. The pico UEs can provide information on the received signal strength of macro cell transmissions at pico UE locations. In one embodiment in the context of the LTE standard, the pico DE can measure one or more of Received Signal Strength Indicator (RSSI), RSRP, or RSRQ of the macro eNB during ABS and/or non-ABS. The pico UEs can report the corresponding RSRQ/RSRP measurements to the macro eNB. In one embodiment, the pico UEs can report the measurements through the pico eNB, using, for example, a backhaul link, such as an X2 backhaul link.

2a. Macro Cell CRS Power Measurement

In one implementation, the pico UEs can measure RSRP values corresponding to the macro eNB transmission, using cell-specific reference symbols (CRS) transmitted from the macro eNB, as described above in connection with FIG. 5. The pico UEs can send the RSRP values (hereinafter, "macro-RSRPs) to the pico eNB. The pico eNB can select the maximum of the macro-RSRP values received from the pico UEs, and send information on the maximum to the macro eNB through the X2 backhaul link.

In certain implementations, during measurement configuration as shown in FIG. 5 (during the time window T1), the pico eNB can configure one or more pico UEs in a cell range expansion (CRE) area (see FIG. 2) to report the macro-RSRP values. These pico UEs in the cell range expansion area would most likely measure the maximum macro-RSRP value and most likely be affected by the low power ABS transmission from the macro eNB because these pico UEs are close to the macro eNB.

In other implementations, pico UEs that are not in the cell range expansion area may also be scheduled for transmission during ABSs. These pico UEs may not be affected by the low power ABS transmissions from the macro eNB. Thus, the pico eNB may not necessarily need to configure the pico UEs outside the cell range expansion area to report the macro-RSRP values. Thus, the pico eNB can configure the pico UEs within the cell range expansion area to report measurements more frequently than the pico UEs outside the cell range expansion area.

When configuring the pico UEs in the CRE area, the pico eNB can use one or more of the following schemes. In one embodiment, the pico eNB can have information on some pico UEs within the CRE area which have already been configured for measurement reporting. In such an embodiment, if there are other pico UEs in the CRE area that have not been configured for measurement reporting, the pico eNB can configure the other pico UEs with, for example, the A2 event triggering criterion. The term "A2 event triggering criterion" refers to an event-triggered reporting criterion where the serving cell becomes worse than an absolute threshold (hereinafter, referred to as "A2 event threshold"). In configuring the other pico UEs, the pico eNB can set an appropriate A2 event threshold, based on knowledge of past RSRP reports in the pico cell.

In another embodiment, the pico eNB can configure the pico UEs in the CRE area (which have not already been configured for measurement reporting) to provide periodical reporting of the macro-RSRP values. Assuming that a path loss between the macro eNB and the pico DE is slowly varying, the interval for the periodic reporting can be set to a high value to reduce overhead.

The measurement reports can be forwarded by the pico eNB to the macro eNB via the X2 backhaul link. The measurement reports can provide the macro eNB with information on the signal strength of its CRS transmissions at the pico UEs' locations. The information can be used to derive a power level (or the maximum power level) appropriate for low power transmission from the macro eNB during ABS. The low power transmission can be used for physical downlink control channel (PDCCH) and/or physical downlink shared channel (PDSCH).

2b. Macro Cell Low Power Level Monitoring

In another implementation, in addition to the RSRP values reported by the pico UEs, the macro eNB can further use information on a power ratio of data signal to reference signal. In one implementation in the context of the LTE, the power ratio can be a ratio of Physical Downlink Shared Channel (PDSCH) Energy per Resource Element (EPRE) to Cell-specific Reference Symbol (CRS) EPRE (hereinafter, referred to as "PDSCH EPRE-to-CRS EPRE ratio") for the low-power PDSCH transmission during ABSs (hereinafter, referred to as "the ABS low-power PDSCH transmission). The RSRP values and the PDSCH EPRE-to-CRS EPRE ratio can be used to obtain an estimate of the received strength of its ABS low-power PDSCH transmission on the pico UEs.

In an LTE system, the PDSCH EPRE-to-CRS EPRE ratios are generally denoted by either parameter $\rho_A$ or $\rho_B$. The PDSCH EPRE-to-CRS EPRE ratio is denoted either by $\rho_A$ or $\rho_B$ according to the OFDM symbol index as defined in 3GPP TS 36.213 v10.1.0, "Evolved Universal Terrestrial Radio Access (E-UTRA); Physical Layer Procedures (Release 10)," March 2011, Section 5.2. Given that the ratio $\rho_B/\rho_A$ is cell-specific, since $\rho_B$ can be determined, based on $\rho_A$ and other cell-specific parameters, the PDSCH EPRE-to-CRS EPRE ratio can be represented by $\rho_A$ for notational convenience in this document. This mechanism can enable the macro eNB to monitor the effect of its ABS low-power PDSCH transmission on pico UEs. It should also be noted that the macro eNB can use the RSRP feedback from the pico UEs to set the appropriate power for low-power PDCCH transmission during ABSs.

When the macro eNB receives a new maximum macro-RSRP report from one of the pico eNBs, the macro eNB can approximately estimate the worst case received strength of its ABS low power transmission on the pico UEs. This can be achieved by, for example, scaling the received maximum macro-RSRP value by the maximum $\rho_A$ and $\rho_B$ values among all macro UEs scheduled for low power transmission during ABSs. If the worst case received signal strength due to the ABS low power transmission on the pico UEs is higher than an acceptable interference value $\chi$, the macro eNB can reduce the Maximum ABS Low-Power Setting (MALPS) value by a predefined update step $\Delta_{MALPS}$.

2c. Measurement Reporting from Pico UEs to Macro eNB Through Pico eNB

Figure 7:
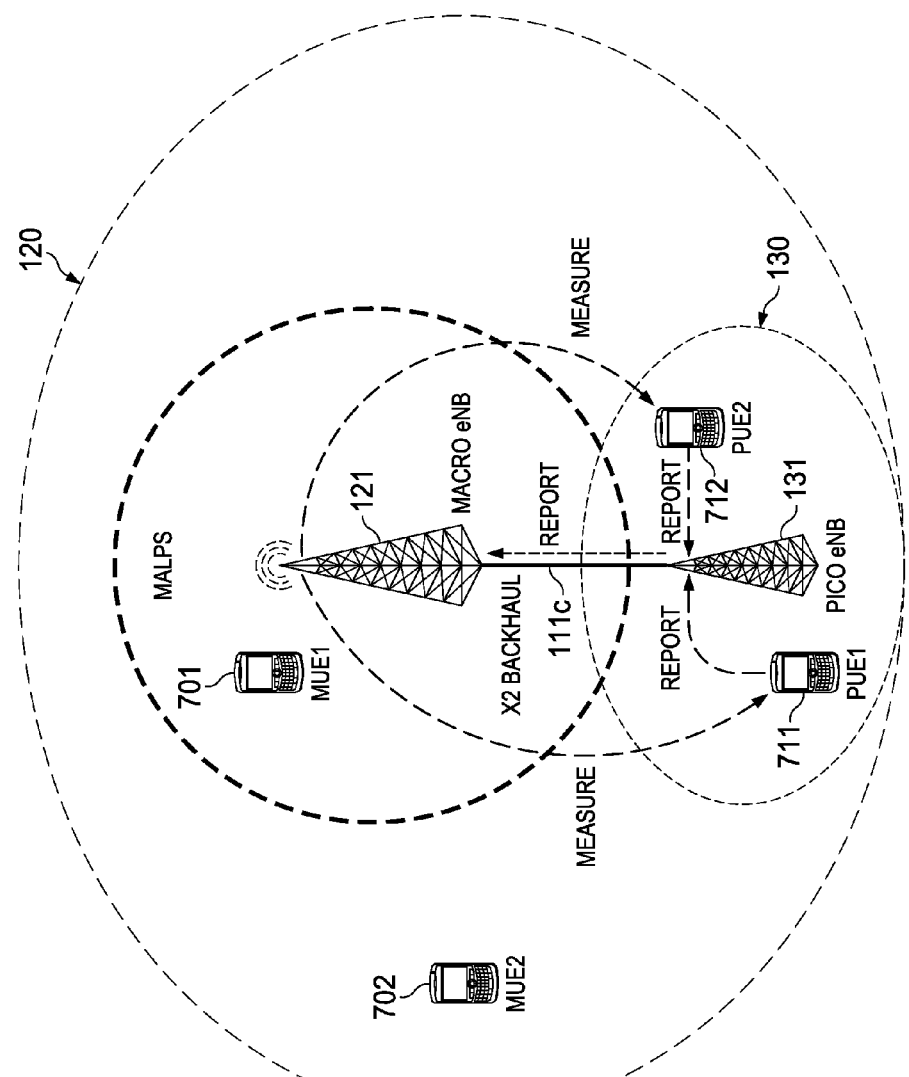
FIG. 7 is a schematic diagram illustrating a method of reporting power measurement by user equipments to a macro eNB via a pico eNB according to one embodiment.
Figure 8:
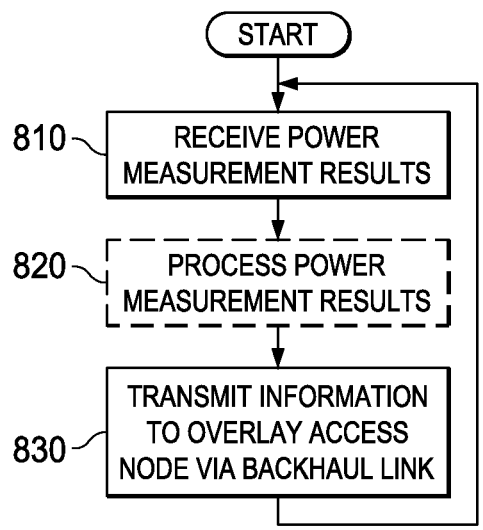
FIG. 8 is a flowchart illustrating a method of operating a pico eNB according to one embodiment.

The measurement results described above can be reported by the pico DE directly or indirectly to the macro eNB. Referring to FIGS. 7 and 8, in one embodiment, pico UEs 711, 712 can report measurement results to a pico eNB 131 with which they are associated. The pico eNB 131 can then communicate the pico DE measurements to the macro eNB 121 via an X2 interface or backhaul link 111c.

In one embodiment, when reporting the pico UEs' received power measurements corresponding to the macro eNB 121, the pico eNB 131 can report only the largest received power measurement from all the pico UEs in its pico cell. Then, the macro eNB 121 can consider only the largest received power measurement by one of the pico UEs 711, 712, from one or more of pico eNBs 121 in determining a power level for PDSCH transmission during ABS.

For example, the pico UEs 711, 712 can report macro cell received power measurements to the pico eNB 131. The pico eNB 131 can determine maximum received macro cell power from all the pico UE reports. Then, the maximum received power can be reported by the pico eNB 131 to the macro eNB 121 via the X2 interface 111c. The macro eNB 121 can thus have information on the maximum received power within the macro cell, and can use the information to determine the power level for transmission during ABS (for example, PDCCH/PDSCH transmission).

In another embodiment, the power measurement results from the two or more pico eNBs (each of which follows a procedure similar to the procedure described above to determine the maximum received power) can be forwarded to the macro eNB 121. The macro eNB can determine the maximum received power from the received results, and use it for determining the power level for transmission during ABS (for example, PDCCH/PDSCH transmission).

Referring to FIG. 8, in the above described embodiments, the pico eNB can first receive power measurement results from pico UEs at a block 810. Then, the pico eNB can optionally process the power measurement results to select, for example, the maximum received macro cell power at a block 820. Subsequently, the pico eNB can transmit information on the power measurement results to the overly access node (for example, the macro eNB 121) via a backhaul link The steps at the blocks 810-830 can be repeated, as needed.

3. Power Estimation by Macro UEs

Figure 9:
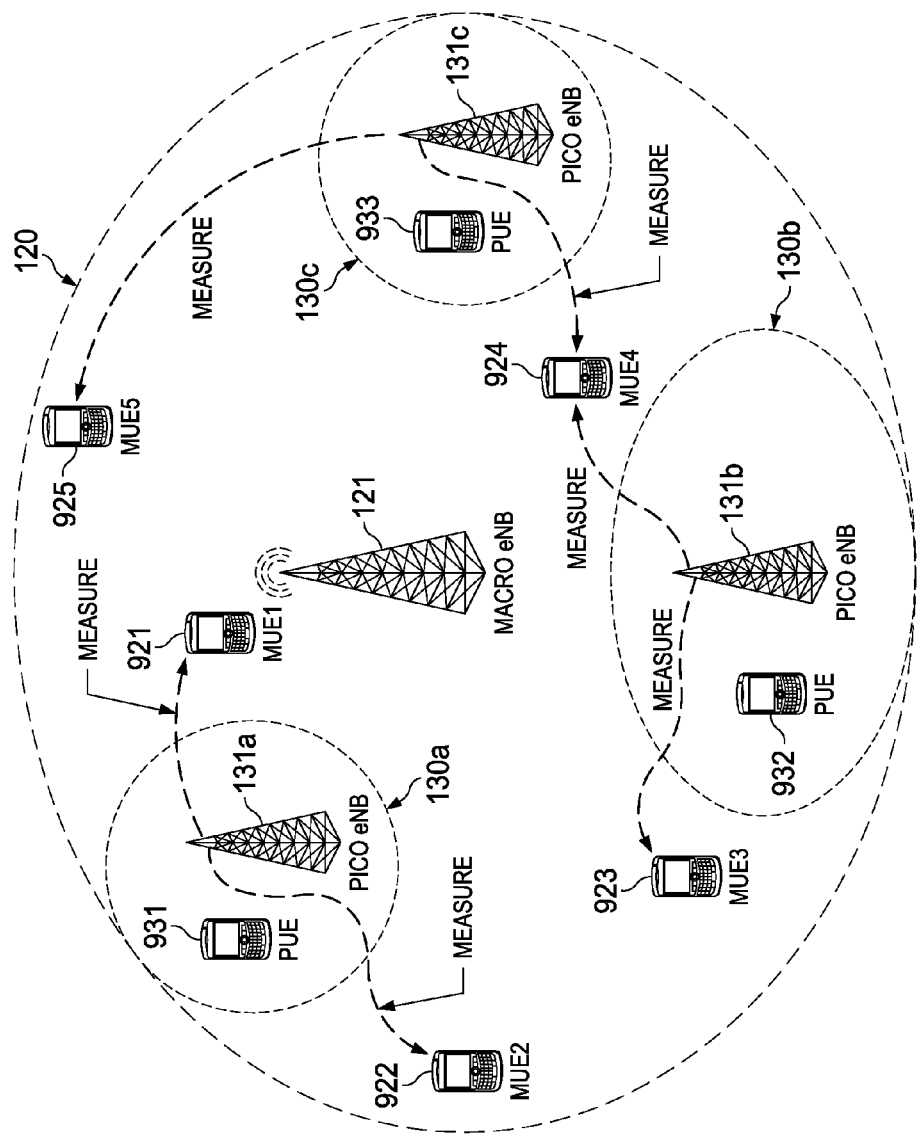
FIG. 9 is a schematic diagram illustrating a method of reporting power measurement by user equipments to a macro eNB according to another embodiment.

Referring to FIG. 9, a method of power estimation by macro UEs for use in adaptive transmission during ABSs will be described below. In the illustrated embodiment, one or more macro UEs 921-925 can measure power (for example, RSRP) from its serving macro cell 120 and/or its neighboring pico cells 130a-130c. The macro UEs 921-925 can report the measurement results to the macro eNB 121. The measurement results can include, for example, the serving-macro RSRP and/or the maximum among measured neighboring pico RSRPs. In certain embodiments, the macro eNB 121 can use the measurement results from the macro UEs 921-925 in combination with the measurement results or information from the pico UEs 931-933 or the pico eNB(s) 131a-131c.

3a. Determination of Potential Macro UEs for Low Power ABS Transmissions

As described above in connection with the block 620 of FIG. 6, the macro eNB can utilize the measurement results from the macro UEs (along with the pico UE measurement reporting) to determine whether a given macro UE can be chosen for low power transmission or reception (for example, PDCCH/PDSCH reception) during ABS. In implementations described herein, max{$RSRP_{M,PUE}$} denotes the maximum macro-RSRP received from the pico UEs forwarded through the pico eNB as described above. Furthermore, $RSRP_{M,MUEj}$ represents the RSRP corresponding to the serving-macro eNB as measured by the j-th macro UE. $RSRP_{Pmax,MUEj}$ denotes the maximum among measured neighboring pico RSRPs from the j-th macro UE. In some embodiments, the rate of change in the reports of a UE can be used to determine its membership in the set {$S_1$}.

First, the macro eNB can compare the serving-macro RSRPs reported by the macro UEs to max{$RSRP_{M,PUE}$}, and identify the set {$S_1$} of macro UEs that satisfy the condition a $RSRP_{M,MUEj}$>max{$RSRP_{M,PUE}$}, where 0<<α<1. The parameter α is a scaling parameter that can be included to control the number of macro UEs in the set {$S_1$}. This step can be used for generally identifying macro UEs that may be chosen to receive low power PDCCH/PDSCH during ABSs.

Next, when $RSRP_{Pmax,MUEj}$ values corresponding to the macro UEs in the set {$S_1$} are available, the macro eNB can compute or calculate a ratio, $RSRP_{M,MUEj}$/$RSRP_{Pmax,MUEj}$ for each of the macro UEs in the set {$S_1$}. This ratio can serve as an approximate indication of the Signal-to-Interference Ratio (SIR) of the macro UEs in the set {$S_1$}. In other words, macro UEs with higher $RSRP_{M,MUEj}$/$RSRP_{Pmax,MUEj}$ ratios are less likely to experience interference from the pico eNBs than those macro UEs with lower $RSRP_{M,MUEj}$/$RSRP_{Pmax,MUEj}$ ratios. This additional step can be used by the macro eNB in further narrowing the set {$S_2$} of macro UEs that can be chosen to receive low power PDCCH/PDSCH during ABS. Note that the macro UEs in {$S_2$} are a subset of the macro UEs in {$S_1$}.

3b. Setting Power Level for Low Power ABS Transmissions

As described above in connection with the block 630 of FIG. 6, once the set of macro UEs that can receive low power PDCCH/PDSCH during ABS has been determined, the power level suitable for the low power ABS transmissions can be determined. Such determination can be based at least partly on the maximum macro-RSRP (i.e., max{$RSRP_{M,PUE}$}) received from the pico UEs through the pico eNB.

First, max{$RSRP_{M,PUE}$} can be used by the macro eNB to determine the MALPS value. Alternatively, a minimum relative difference between received signal powers, which will be described later, can be used to determine the MALPS value.

Subsequently, the power level(s) suitable for the low power ABS transmissions can be set by the macro eNB such that the PDCCH resource element (RE) energy and the PDSCH Energy per Resource Elements (EPREs) do not exceed MALPS for those macro UEs scheduled to receive low power transmission during ABS, taking into account the appropriate scaling due to $\rho_A$ and $\rho_B$. In the case of PDSCH, the $\rho_A$ and $\rho_B$ values may be further reduced, based on Channel State Information (CSI)/Channel Quality Indicator (CQI) feedback during ABS from the macro UEs receiving low power ABS transmissions.

3c. RSRP Reporting by Macro UEs

The RSRP reports can be obtained by the macro eNB via one or a combination of the following options. In one option, the macro eNB can configure the macro UEs to perform periodic reporting of the RSRPs. Assuming a path loss between the eNB and macro DE is slowly varying, the interval for the periodic reporting can be set to a relatively high value to reduce overhead. When configuring such macro UEs with periodic reporting, the macro eNB may exclude certain macro UEs that are known to be near the macro cell edge (since they have a low serving cell RSRP value) as these cell-edge macro UEs are not likely to be scheduled to receive low power PDCCH/PDSCH during ABS.

Another option is to utilize power headroom reports for those macro UEs that report the power headroom to the macro eNB. The macro eNB can obtain an approximate downlink path loss from the power headroom reports and use the path loss information to decide which macro UEs need to be configured for RSRP reporting.

Yet another option is for the macro eNB to configure the macro UEs that have not already been configured to report with an A2 event triggering criterion. Since the macro eNB is only interested in scheduling the cell-center macro UEs for low power transmissions during ABS, the macro eNB may exclude the cell-edge macro UEs (which may already be configured using another triggering event) from this type of configurations. To configure the macro UEs, the macro eNB can set the A2 event threshold to be low enough so that the cell-center macro UEs report their RSRPs to the macro eNB. These macro UEs can be configured for event-triggered periodic reporting. The macro eNB can choose appropriate low A2 threshold values based on knowledge of past RSRP reports in the cell.

4. PDSCH EPRE-to-CRS EPRE Ratio Signaling

In one embodiment, once the PDSCH EPRE values corresponding to macro UEs selected for transmission during ABS have been determined by the macro eNB, the macro eNB can signal a message, such as the Message MeNB of FIG. 5 to the selected macro UEs. The message can include a power ratio(s) of data signal to reference signal, for example, PDSCH EPRE-to-CRS EPRE power ratios. This can help the selected macro UEs decode PDSCH symbols transmitted from the macro eNB during ABSs.

As described earlier, in an LTE system, this ratio corresponds to $\rho_A$ and $\rho_B$. Given the low power level associated with the ABS PDSCH transmission compared to the CRS EPRE, the embodiment may benefit by extending the current range of $\rho_A$ (and $\rho_B$) specified in 3GPP TS 36.331 v10.1.0, "Evolved Universal Terrestrial Radio Access (E-UTRA); Radio Resource Control (RRC) Protocol Specification (Release 10)," March 2011, Section 6.3.2. This can be equivalent to extending/shifting the current range of possible values allowed for the UE-specific parameter $P_A$ specified as part of parameter or information element (IE), PDSCH-Config defined in 3GPP TS 36.331 v10.1.0.

In an alternative embodiment, new ratios $\rho_{A,ABS}$ and $\rho_{PB,ABS}$ can be defined to be specific to the low power transmission during ABS. This can require introducing a new UE-specific parameter $P_{A,ABS}$ in addition to the $P_A$ parameter specified in the IE PDSCH-ConfigDedicated of 3GPP TS 36.331 v10.1.0. The range of possible values allowed for the new UE-specific parameter $P_{A,ABS}$ can be much lower than the range of values allowed for the existing $P_A$ parameter (since $P_{A,ABS}$ is specific to low power transmissions during ABS).

The relationship between $\rho_{A,ABS}$ and $\rho_{A,ABS}$ is similar to the relationship between $\rho_A$ and $P_A$ as defined in 3GPP TS 36.213 v10.1.0, "Evolved Universal Terrestrial Radio Access (E-UTRA); Physical Layer Procedures (Release 10)," March 2011, Section 5.2. Given $\rho_{A,ABS}$, the cell-specific parameter $P_B$ specified in the IE *PDSCH-ConfigCommon* (see 3GPP TS 36.331 v10.1.0), and the number of configured eNB cell-specific antenna ports, the ratio $\rho_{B,ABS}$ can be determined using Table 5.2-1 of 3GPP TS 36.213 v10.1.0 (in other words, the ratio $\rho_{B,ABS}/\rho_{A,ABS}$ is cell-specific and can be equal to the existing cell-specific ratio $\rho_B/\rho_A$). In this case, a one bit indicator may be added to the PDCCH downlink control information (DCI) which indicates to the macro UEs the appropriate PDSCH EPRE-to-CRS EPRE ratio to use for data demodulation (i.e., this one bit indicator can be used to instruct the macro UE to use either $\rho_{A,ABS}$ or $\rho_A$, depending whether it is receiving low power transmission during ABS or not). Alternatively, the appropriate PDSCH EPRE-to-CRS EPRE ratio to use for data demodulation may be indicated to the macro UEs via RRC signaling.

5. Channel Quality Indication (CQI) Reporting During ABS

In one embodiment, a modified CQI measurement can be specified to support low power transmissions during ABS in the embodiments described above. The modified CQI measurement for ABS can be needed because CQI is a function of $\rho_A$ (note that $\rho_A$ has a modified range in order to support low power transmission during ABS, as described above). The modified CQI measurement can be reported to the macro eNB as needed after the macro UE is chosen to receive low power transmissions during ABS. Alternatively, if there are two values, i.e., $\rho_{A,ABS}$ and $\rho_A$, the UE can transmit two CQI reports, based on $\rho_{A,ABS}$ and $\rho_A$ respectively.

6. Alternative Embodiment for Macro Cell Low Power Level Monitoring

In some of the embodiments described above, the macro eNB can use the pico UE-reported RSRP values along with its knowledge of the PDSCH EPRE-to-CRS EPRE ratio corresponding to the ABS low-power PDSCH transmission to obtain an estimate of the received strength of its ABS low-power transmission on the pico UEs. In an alternative embodiment, the maximum among all the PDSCH EPRE-to-CRS EPRE (i.e., $\rho_A$) ratios corresponding to the ABS low power transmission can be made available in a common PDSCH configuration, and can be transmitted, for example, broadcast as System Information Blocks (SIBs) or common RRC messages (it should be noted that $\rho_A$ is a DE specific field).

In some cases, a default value of $\rho_A$ can be made available in a common PDSCH configuration (for example, this default value can be set to the maximum or the average value). Then, the pico UEs would be able to read the $\rho_A$ value corresponding to the ABS low power transmission during neighbor cell measurements. Each of the pico UEs then scales its measured RSRP corresponding to the macro eNB by $\rho_A$ to obtain an estimate of the received strength of the ABS low-power transmission at the pico UE. The pico UEs can report these ABS low-power received strength estimates to the macro eNB through its serving pico eNB. If the worst case received signal strength due to the ABS low power PDSCH transmission on the pico UEs is higher than the acceptable interference value $\chi$, the macro eNB can reduce the MALPS value by a predefined update step $\Delta_{MALPS}$.

7. Alternative Embodiments for Measurement Reporting from Pico UEs to Macro eNB

In some of the embodiments described above, the pico UEs can report their measurements to the macro eNB through the pico eNB (for example, via the X2 interface). In other embodiments, various other options are also possible as follows.

In an alternative embodiment, a relative difference between received signal power values can be reported, instead of numerical values of the received signal powers. For example, the pico UEs can measure the RSRP values corresponding to the macro eNB and the serving pico eNB, and report these values to the serving pico eNB. The pico eNB can then compute relative differences between the RSRP values reported by all pico UEs in its serving area. In the embodiment described herein, the relative difference can refer to $RSRP_{P,PUE} - RSRP_{M,PUE}$, where $RSRP_{M,PUE}$ and $RSRP_{P,PUE}$ respectively denote the RSRP values corresponding to the macro eNB and the serving pico eNB in units of dB. The pico eNB can communicate only the minimum among all relative RSRP differences to the macro eNB via the X2 interface.

The macro eNB can consider only the minimum among all relative RSRP difference reports received from all pico eNBs in its power level determination for PDSCH transmission during ABS. The process can be described as follows.

First, the pico UEs can report the $RSRP_{M,PUE}$ and $RSRP_{P,PUE}$ measurements to the serving pico eNB. The Pico eNB can determine the minimum among all relative RSRP differences corresponding to all pico UEs in its serving area. The pico eNB then reports the minimum among all relative RSRP differences to the macro eNB via the X2 interface. The macro eNB can determine the minimum among all relative RSRP difference reports received from all Pico eNBs in the macro cell. The minimum among all relative RSRP differences from all pico eNB reports can be used to determine the power level for PDCCH/PDSCH transmission during ABS.

In another alternative embodiment, measurements reported by the pico UEs to the pico eNB can be compared to a threshold. If the measurement level exceeds the threshold, the pico cell can send an indication to the macro eNB. The measurement that is compared to a threshold can include a power level of macro eNB, the relative difference of received pico to macro eNB powers, or other reported measurements according to the embodiments described herein. For example, in one implementation, the pico UEs can measure RSRP values corresponding to the macro eNB transmission, using cell-specific reference symbols (CRS) transmitted from the macro eNB, as described previously in connection with FIG. 5. The pico UEs can send the macro-RSRP values to the pico eNB. The pico eNB can select the maximum of the macro-RSRP values received from the pico UEs, and compare the maximum to a threshold for macro-RSRP values. If the reported value exceeds the threshold, the pico eNB can send an indication to the macro eNB through the X2 backhaul link In yet another alternate embodiment, the pico eNB can send information to the macro eNB, based on one or more of the embodiments described above, such that not every message contains detailed measurement information. For example, in one implementation, the pico UEs can measure RSRP values corresponding to the macro eNB transmission as described previously. The pico UEs can send the macro-RSRP values to the pico eNB. The pico eNB can select the maximum of the macro-RSRP values received from the pico UEs. Initially, and periodically thereafter, the pico eNB can send the maximum of the macro-RSRP values to the macro eNB through the X2 backhaul link. Between periodic reports, the pico eNB may compare the report macro-RSRP measurements to a threshold for macro-RSRP values, and if the reported value exceeds the threshold, the pico eNB can send an indication to the macro eNB through the X2 backhaul link In yet another alternative embodiment, measurements can be reported directly from the pico UEs to the macro eNB. For example, the measured RSRP can be directly reported wirelessly to the macro eNB by the pico UEs. These RSRP measurement reports can be performed by each of the pico UEs within the macro eNB's coverage area. This can benefit the system by reducing the signaling load on the backhaul link (i.e., the X2 interface) between the pico eNBs and the macro eNB, but requires allocation of macro eNB radio resources to the pico UEs. This may facilitate flexible reconfiguration of low power level value for PDCCH/PDSCH transmission with changing traffic load conditions (when a pico cell range expansion takes place, the low power level for PDCCH/PDSCH during ABS may need to be reduced).

8. Alternative Embodiments for Pico/Macro Cell Strength Measurements

In the embodiments described above, macro UEs can measure the RSRPs corresponding to its serving macro-cell and neighboring pico-cells and report these measurements to the macro eNB. In an alternative embodiment, RSRP/RSRQ measured during ABSs can be reported to a macro eNB. For example, a macro DE can measure the RSRP and Received Signal Strength Indicator (RSSI) during ABSs, and report the RSRP and the corresponding RSRQ to the macro eNB. The RSRP and RSRQ measured during ABSs can be utilized by the macro eNB to obtain an approximate estimate of the change in the power level of the neighboring cells during ABSs. That is, the macro eNB can use the RSSI (obtained using the reported RSRQ/RSRP measurements) from the ABSs along with the RSSI corresponding to non-ABS subframes and knowledge of its own power level to roughly estimate the change in neighboring cell power levels.

This mechanism can be used in cases where the pico eNB employs different power levels during ABSs and non-ABS subframes. These RSRP/RSRQ measurement reports may provide additional information to the macro eNB in selecting potential macro UEs that can be served with low power PDCCH/PDSCH during ABSs and their associated low power level settings (note that in order to make these decisions, the macro eNB can also rely on the pico UE measurement reports and the macro DE measurement reports). For instance, the macro eNB may first determine the subset $\{S_2\}$ of macro UEs, as described above. Then, using the additional ABS measurements described herein, the macro eNB may further narrow down the potential macro UEs that can be served with low power transmission during ABSs by choosing another set $\{S_3\}$ that experience the lowest interference from neighboring cells during ABSs (the macro UEs in $\{S_3\}$ is a subset of the macro UEs $\{S_2\}$).

In another alternative embodiment, reporting can be performed to determine a path loss between a pico eNB and a macro UE. In such an embodiment, the pico eNB can send information to the macro eNB regarding the pico cell's RS power setting. The macro eNB uses this information along with the RSRP measurement received from the $j^{th}$ macro UE ($RSRP_{Pmax,MUE}$) denotes the maximum among measured neighboring pico RSRPs from the $j^{th}$ macro UE) to approximately determine the smallest path loss $PL_{Pmin,MUEj}$ between one of the pico eNBs and the $j^{th}$ macro UE. This path loss estimate can be used (along with the pico UE measurement reporting mechanisms described above and the macro DE measurement reports) by the macro eNB in determining potential macro UEs that can be served with low power PDCCH/PDSCH during ABSs while reducing or minimizing interference from the pico eNBs. In an embodiment using an LTE system, to facilitate the determination of the approximate path loss values, the pico eNB can send information regarding the referenceSignalPower parameter provided by higher layers to the macro eNB.

In one example, the macro eNB can utilize the measurement reports to determine whether a given macro DE can be chosen to receive low power PDCCH/PDSCH during ABSs. In the example, $\max\{RSRP_{M,PUE}\}$ denotes the maximum macro-RSRP received from the pico UEs through the pico eNB. Further, $RSRP_{M,MUE_j}$ represents the RSRP corresponding to the serving-macro eNB from the $j^{th}$ macro UE. Then, the macro eNB can determine whether a given macro UE can be chosen to receive low power PDCCH/PDSCH during ABSs using the following steps.

The macro eNB can compare the serving-macro RSRPs reported by the macro UEs to $\max\{RSRP_{M,PUE}\}$, and identify the set $\{S_1\}$ of macro UEs that satisfy the condition $\alpha\,RSRP_{M,MUEj} > \max\{RSRP_{M,PUE}\}$, where $0 \ll \alpha < 1$. $\alpha$ represents a scaling parameter that can be included to control the number of macro UEs in the set $\{S_1\}$. This can be the basic step in identifying the macro cell-centered macro UEs that may be chosen to receive low power PDCCH/PDSCH during ABSs.

For each of the macro UEs in the set $\{S_1\}$, the macro eNB can approximately determine the smallest path loss $PL_{Pmin,MUEj}$. It may be beneficial to choose the macro UEs in the set $\{S_1\}$ with high $PL_{Pmin,MUEj}$ values as these macro UEs are likely to suffer the minimum interference from the pico eNBs. This additional step can be used by the macro eNB in further narrowing down the set $\{S_2\}$ of macro UEs that may be chosen to receive low power PDCCH/PDSCH during ABS (note here that the macro UEs in $\{S_2\}$ are a subset of the macro UEs in $\{S_1\}$).

9. Reporting Pico eNB-Macro eNB RSRP Ratios

In some embodiments, an initial set of candidate macro UEs can be identified by comparing the signal powers received by a macro UE. Each macro UE served by the macro eNB can measure the RSRPs from the closest pico eNBs. Each macro UE then compares RSRP measurements from the closest pico eNBs to the RSRP measurement corresponding to the serving macro eNB. In an embodiment described herein, parameters $RSRP_{P1,MUE}$ and $RSRP_{P2,MUE}$ denote the RSRP measurements related to the two closest pico eNBs made at a given macro UE. Similarly, parameter $RSRP_{M,MUE}$ denotes the most recent RSRP measurement corresponding to the serving macro eNB. Then, the macro DE can compute the ratios $RSRP_{M,MUE}/RSRP_{P1,MUE}$ and $RSRP_{M,MUE}/RSRP_{P2,MUE}$. In some embodiments, the macro UE reports the minimum $RSRP_{M,MUE}/RSRP_{P,MUE}$ value from the set of nearest pico-cells to the Macro eNB. This is an example where ratios are used for reports. The ratios omit some information. However, in other embodiments, it is possible to report both the numerator and denominator parameters separately.

In some alternative embodiments, the pico cell ID can be included in the reporting to the macro eNB. These measurement reports can be used by the macro eNB to identify macro UEs that may be able to receive low-power PDCCH/PDSCH transmissions during ABSs. A further analysis can identify these macro UEs as candidates either for lower-power transmissions (the macro eNB can also require the pico DE measurement reports described above to make this decision) or for higher power beamformed transmissions. The procedure for determining the potential macro UEs for low power ABS transmissions using this embodiment is similar to the procedure described above in Section 3a, except that the ratios in this embodiment are calculated at the macro DE (whereas the ratios are calculated by the macro eNB in Section 3a).

10. Binary Reporting by Macro UE

Figure 10:
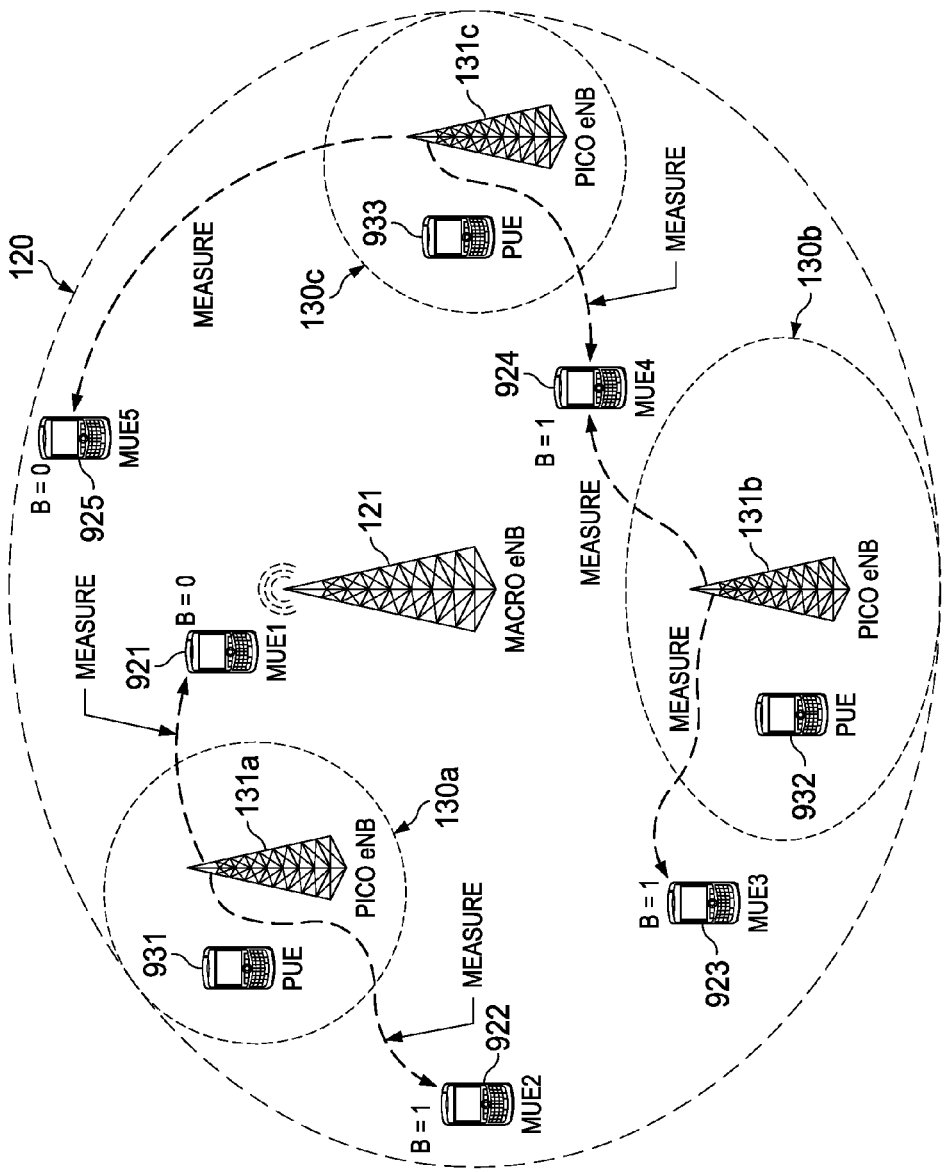
FIG. 10 is a schematic diagram illustrating a method of reporting power measurement by user equipments to a macro eNB according to yet another embodiment.

Referring to FIG. 10, in another embodiment, binary reporting can be used by macro UEs to indicate their proximity to pico cells. In the illustrated embodiment, the ratio (computed by the macro DE) corresponding to each nearest pico-cell 131a-131c can be compared to a predefined power level ratio threshold (PLRT) value $R_{th}$. This threshold value can be specified by the macro eNB 121 in a broadcast message or via RRC signaling. If any one of the macro eNB-pico eNB RSRP ratios is less than the PLRT value, the macro UE 921-925 can set a binary pico cell proximity indicator B to 1. On the other hand, if all of the macro eNB-pico eNB RRSP ratios at a given macro UE 921-925 are above the PLRT $R_{th}$, then the binary pico cell proximity indicator B can be set to 0.

This binary indicator communicates the signal strength ratios which can be indicative of geographical proximity of the macro DE 921-925 to the pico cell 130a-130c. A value of B=1 indicates that the macro DE may be in close proximity to a pico cell, while a value of B=0 indicates that it may be further away from a pico cell. One or more of the macro UEs 921-925 can report the determined indicator value to the macro eNB 121. In some embodiments, the pico cell ID is added to the binary indicator in the report to the macro eNB 121. These reports can be used by the macro eNB in selecting potential macro UEs that can be served during ABSs either with lower power transmissions (note that in order to make these decisions, the macro eNB can also require the pico UE measurement reports and the macro UE reports) or with beamformed transmissions.

11. Alternative Embodiment for Link Quality Monitoring During ABS

In some embodiments, a ratio between the power of a reference signal and data can be lowered. Energy per Resource Element (EPRE) can be such a ratio, as explained later (in the context of computation of CQI). In general, the CRS EPRE does not change during ABSs (i.e., the CRS EPRE remains the same for ABS and non-ABS subframes). However, in a scenario where the CRS EPRE during ABSs is also lowered, a more flexible downlink radio link quality monitoring mechanism for the macro UEs receiving low power transmission during ABSs may be needed. To this end, a new pair of thresholds $Q_{out,ABS}$ and $Q_{m,ABS}$ (that are specific to ABS subframes only) can be introduced. A new pair of thresholds may be needed since a new set of requirement tests may be defined for ABSs with low power transmissions (it should be noted that the ratio of PDCCH RE energy to average RS RE energy is one of the transmission parameters that are specified in defining the threshold pairs for determining out-of-sync/in-sync statuses in 3GPP TS 36.133 v10.3.0, "Evolved Universal Terrestrial Radio Access (E-UTRA); Requirements for support of radio resource management (Release 10)," June 2011, Section 7.6). This new pair of thresholds can be beneficial in determining the quality for the low power transmissions during ABSs. The new pair of thresholds can also allow the macro UEs to have more flexibility to receive low power transmission during ABSs without always declaring out-of-sync to the higher layers during ABSs.

EXAMPLES

Example 1

Operation during Pico Cell Range Expansion

During pico cell range expansion, the macro eNB can receive updated reports based on the most recent measurements from the pico UEs (either through the pico eNB or directly from the pico UEs). Likewise, the macro eNB can also receive updated measurement reports from the macro UEs. These reports can be used by the macro eNB to reselect potential macro UE candidates to receive low power PDCCH/PDSCH during ABSs. The power level suitable for low power ABS transmissions for the potential macro UEs can also be determined by the macro eNB at this stage. Based on the reports from pico UEs, the macro eNB can also update the MALPS value.

In some alternate embodiments, the operation during pico cell range expansion can be as follows. The macro UEs can re-compute the pico-cell RSRP to macro-cell RSRP ratios based on the most recent pico cell strength measurements. These ratios (or alternatively the binary indicators corresponding to these ratios) can be reported to the macro eNB. Upon receiving the updated pico-cell RSRP to macro-cell RSRP ratios (or alternatively the binary indicators corresponding to these ratios), the macro eNB can update the set of macro UEs that are potentially suitable to receive low power PDCCH/PDSCH during ABSs (it should be noted that the macro eNB can also use updated reports from the pico UEs in performing these updates).

Example 2

Adaptability to Macro UE/Pico DE Distributions

Figure 11A:
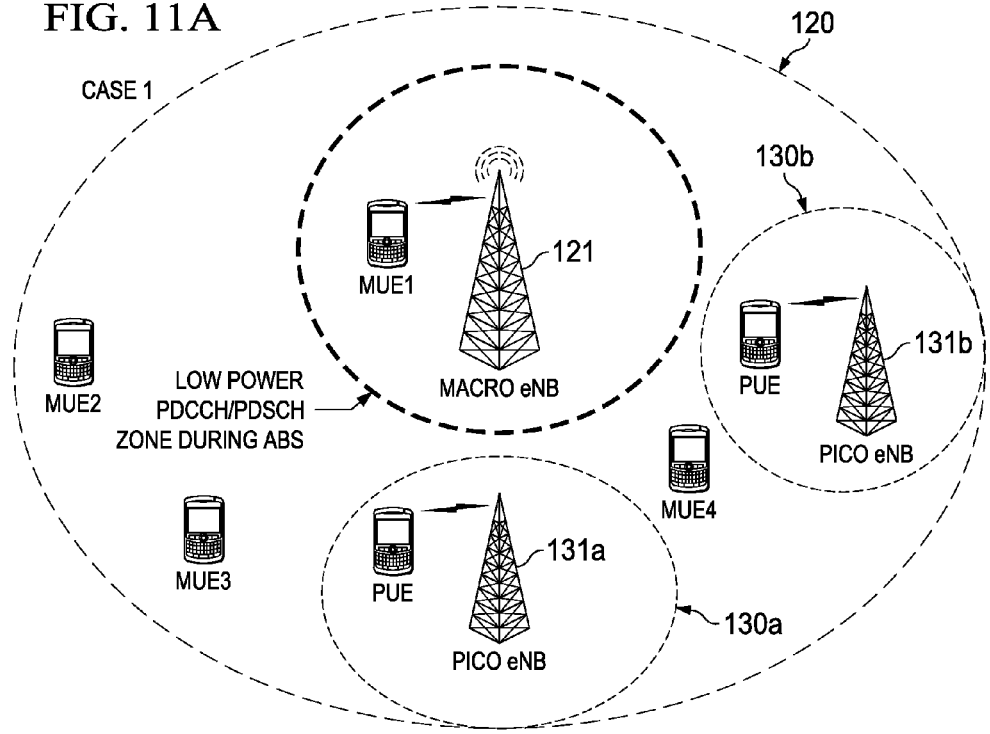
FIGS. 11A and 11B are schematic diagrams illustrating the adaptability of a wireless communication to different user equipment positions according to one embodiment.
Figure 11B:
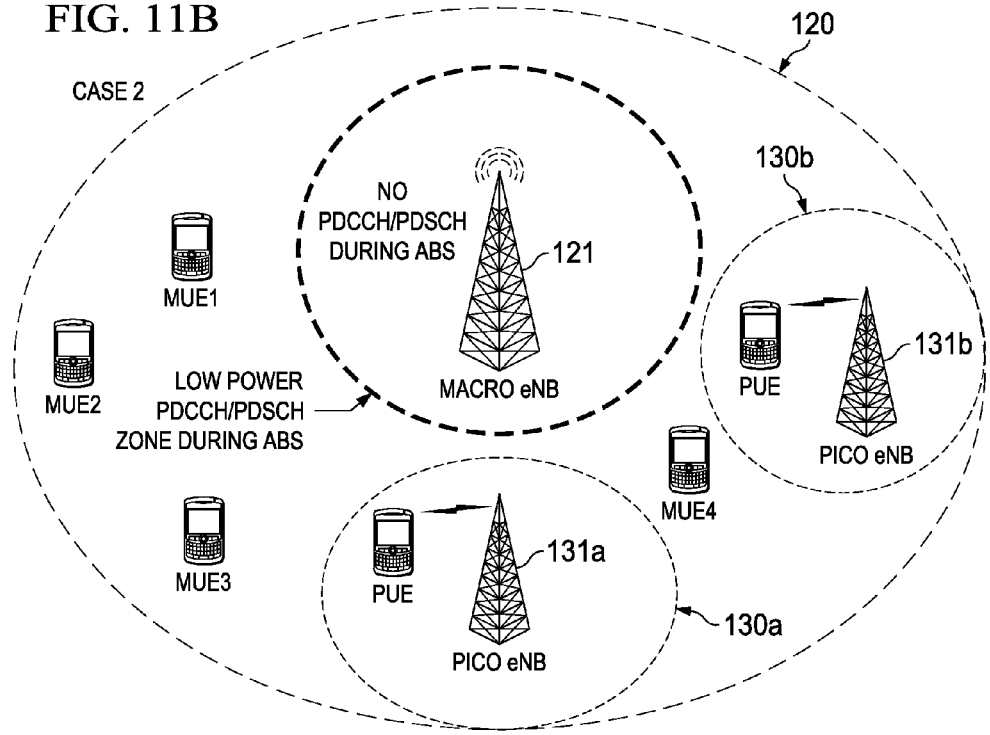

FIGS. 11A and 11B illustrate the adaptability of the above described embodiments to different pico UE/macro DE distributions within the macro cell's coverage area. In Case 1 shown in FIG. 11A, a first macro UE (MUE 1) is scheduled to receive low power PDCCH/PDSCH during ABSs since MUE 1 is located sufficiently further away from causing significant interference to any of the pico UEs (PUE). In contrast, for Case 2 shown in FIG. 11B, the macro eNB 121 does not transmit PDCCH/PDSCH during ABSs even at the lower power. This is because none of the macro UEs (MUE1-MUE4) in Case 2 are determined to be suitable to receive low power control and data transmissions during ABS. Thus, in the above embodiments, the low power PDCCH/PDSCH transmission during ABS can be adapted to different macro UE/pico DE locations or distributions.

In summary, the embodiments described above provide a method that enables the macro eNB to serve low-power data and control information during ABSs to some of the macro UEs which are in close proximity to the macro eNB (while ensuring that such transmissions do not cause significant interference to the pico cell users located within the macro cell). The embodiments also provide mechanisms to adaptively identify the macro UEs that can be served with low-power data and control information transmissions from the macro eNB during ABSs. The embodiments further provide mechanisms to adaptively identify the macro UEs that are not located near any pico eNB and that can be served with beam-formed data and control information transmissions from the macro eNB during ABSs.

In addition, the embodiments described above provide methods to determine the low power level appropriate for data and control information transmissions from the macro eNB during ABSs. The embodiments also provide mechanisms for enabling the macro eNB to monitor the effect of its ABS low-power transmissions on the pico UEs. Further, the embodiments provide a maximum macro cell received strength measurement reporting procedure from pico UEs to the macro eNB through the pico eNB. The embodiments also provide a procedure for reporting the relative difference between received signal powers from pico UEs to the macro eNB through the pico eNB. The embodiments also provide reporting mechanisms for macro UEs' Pico/Macro cell strength measurements. The embodiments also provide PDSCH EPRE to CRS EPRE ratio signaling to facilitate the decoding of the ABS low-power data and control information by the macro UEs. The embodiments also provide modified CQI measurement methods for low power transmissions during ABSs.

The embodiments described above can have several advantages as follows. The macro eNB can serve low power data and control information to at least some of the macro UEs which are close to it during the ABSs (as long as those macro UEs are sufficiently further away from causing significant interference to any of the pico cells within the macro cell). This can potentially lead to increased throughput for the macro UEs that are close to the macro eNB.

In addition, the embodiments also allow the macro eNB to flexibly adapt its low power level for data and control information transmissions during ABSs by (1) determining the received CRS signal strength or (2) directly estimating the received signal strength of low power transmissions at the pico DE location(s). In some embodiments, the pico DE sends this information to its serving pico cell which communicates the information to the macro cell through the X2 interface.

Another advantage is that the macro eNB can potentially reserve more ABSs to better coordinate interference at the pico cells within the macro cell. This is possible because the embodiments allow some macro UEs to be scheduled during the ABSs, which frees up some of the resources (i.e., subframes at the macro cell) that would otherwise be used by these macro UEs. These freed up subframes at the macro cell can then potentially be reserved as ABSs for the pico cells.

The embodiments described above also provide robustness to pico cell range expansion. If the cell range of a pico eNB within the macro cell is expanded, the embodiments can ensure that the low power level used by the macro eNB for data and control information transmissions during ABS is quickly adapted.

Additionally, in the embodiment in which pico UEs send measurement reports to the macro eNB directly (without relaying the measurement reports through a backhaul link between the macro and the pico eNBs), the load on the backhaul can be reduced which translates into reduced costs for the network operator.

Figure 12:
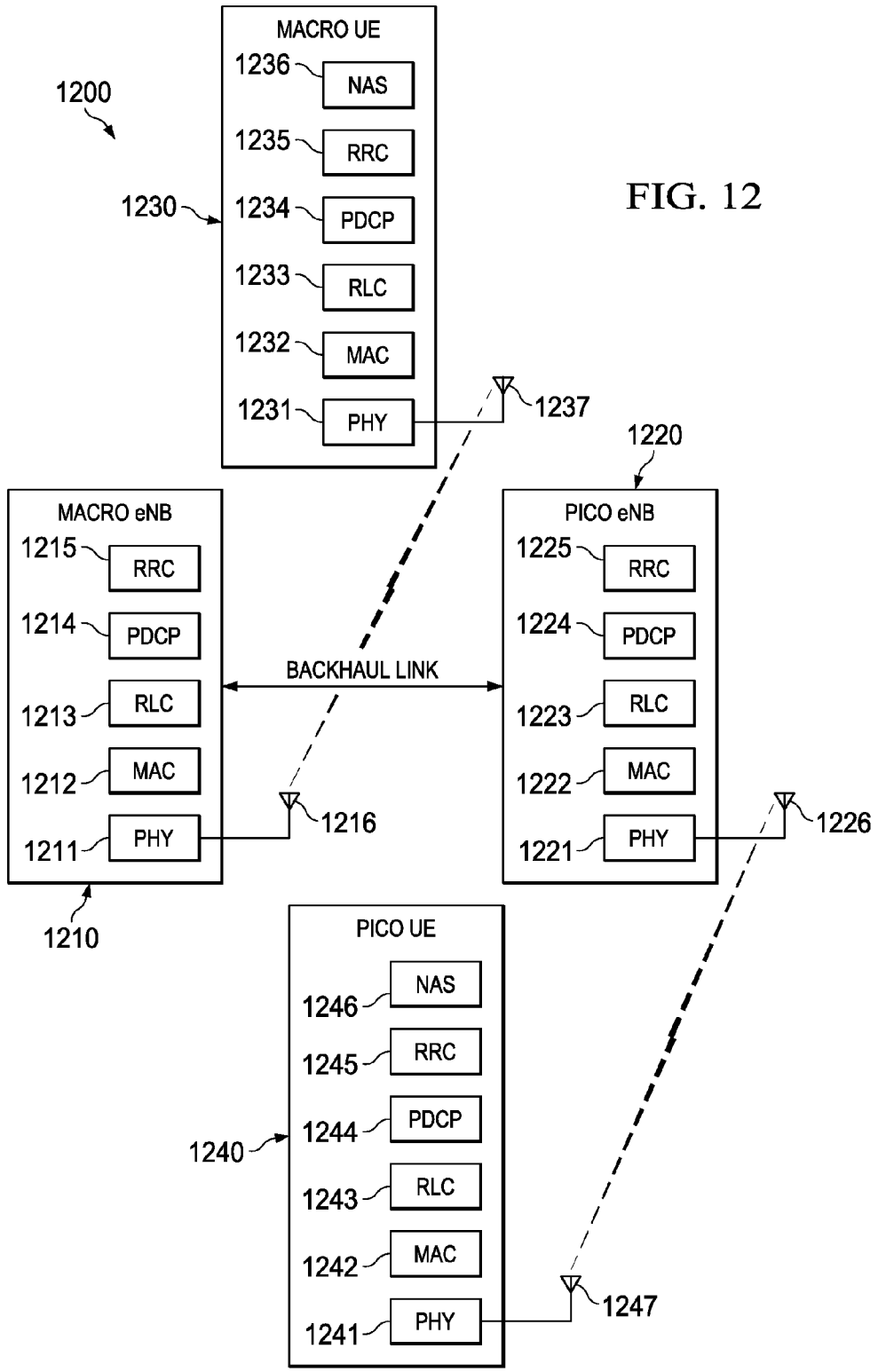
FIG. 12 is a schematic block diagram illustrating various layers of access nodes and user equipments in a heterogeneous wireless communication network according to one embodiment.

Referring to FIG. 12, one embodiment of a heterogeneous wireless communication system will be described below. The illustrated system 1200 includes a macro eNB 1210, a pico eNB 1220, a macro UE 1230, and a pico UE 1240. The macro eNB 1210 and the pico eNB 1220 can be collectively referred to as a "network," "network components," "network elements," "access nodes," or "access devices." FIG. 12 shows only these four devices (alternatively, referred to as "apparatuses" or "entities") for illustrative purposes, and a skilled artisan will appreciate that the system 1200 can further include one or more of such devices, depending on the needs. The macro eNB 1210 can communicate wirelessly with the macro UE 1230. The pico eNB 1220 can communicate wirelessly with the pico UE 1240. The macro eNB 1210 can communicate with the pico eNB 1210 via a backhaul link, for example, an X2 backhaul link, via a wireless connection, or via a combination thereof.

Each of the devices 1210-1240 includes a protocol stack for communications with other devices via wireless and/or wired connection. The macro eNB 1210 can include a physical (PHY) layer 1211, a medium access control (MAC) layer 1212, a radio link control (RLC) layer 1213, a packet data convergence protocol (PDCP) layer 1214, and a radio resource control (RRC) layer 1215. In case of user plane, RRC layer is not located. The macro eNB 1210 can also include one or more antennas 1216 coupled to the PHY layer 1211. In the illustrated embodiment, a "PHY layer" can also be referred to as "layer 1." A MAC layer can also be referred to as "layer 2." The other layers (RLC layer, PDCP layer, RRC layer and above) can be collectively referred to as a "higher layer(s)."

Similarly, the pico eNB 1220 includes a PHY layer 1221, a MAC layer 1222, a RLC layer 1223, a PDCP layer 1224, and an RRC layer 1225. The pico eNB 1220 can also include one or more antennas 1226 coupled to the PHY layer 1221.

The macro UE 1230 can include a PHY layer 1231, a MAC layer 1232, a RLC layer 1233, a PDCP layer 1234, an RRC layer 1235, and a non-access stratum (NAS) layer 1236. The macro UE 1230 can also include one or more antennas 1237 coupled to the PHY layer 1231. Similarly, the pico DE 1240 can include a PHY layer 1241, a MAC layer 1242, a RLC layer 1243, a PDCP layer 1244, an RRC layer 1245, and a NAS layer 1246. The macro UE 1240 can also include one or more antennas 1247 coupled to the PHY layer 1241.

Communications between the devices, such as between the macro eNB 1210 and the macro DE 1230, generally occur within the same protocol layer between the two devices. Thus, for example, communications from the RRC layer 1215 at the macro eNB 1210 travel through the PDCP layer 1214, the RLC layer 1213, the MAC layer 1212, and the PHY layer 1211, and are sent over the PHY layer 1211 and the antenna 1216 to the macro UE 1230. When received at the antenna 1237 of the macro UE 1230, the communications travel through the PHY layer 1231, the MAC layer 1232, the RLC layer 1233, the PDCP layer 1234 to the RRC layer 1235 of the macro UE 1230. Such communications are generally done utilizing a communications sub-system and a processor, as described in more detail below.

In the embodiments described above in connection with FIGS. 4-11, various steps and actions of the macro eNB, macro UE, pico eNB, and pico DE can be performed by one or more of the layers described above in connection with FIG. 12. For example, the power measurement by the macro DE 1230 can be performed by one or more of the layers 1231-1236, for example, the PHY layer 1231, of the macro UE 1230. For another example, transmission of measurement results can be initiated by the RRC layer 1235.

Figure 13:
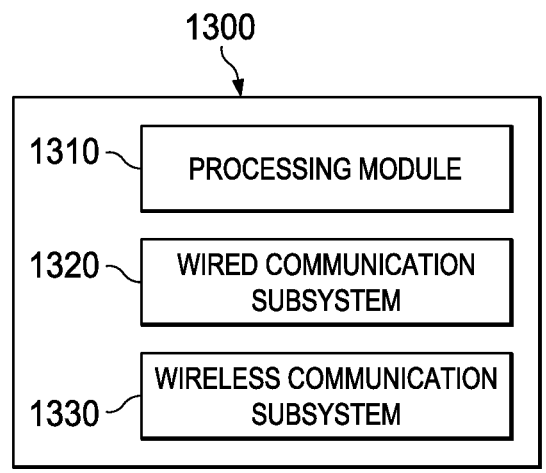
FIG. 13 is a schematic block diagram illustrating an access node device according to one embodiment.

Referring to FIG. 13, an access node device (for example, eNB) according to one embodiment will be described below. The illustrate device 1300 includes a processing module 1310, a wired communication subsystem 1320, and a wireless communication subsystem 1330. The processing module 1310 can include a processing component (alternatively referred to as "processor" or "central processing unit (CPU)") capable of executing instructions related to one or more of the processes, steps, or actions described above in connection with one or more of the embodiments disclosed herein. The processing module 1310 can also include other auxiliary components, such as random access memory (RAM), read only memory (ROM), secondary storage (for example, a hard disk drive or flash memory). The processing module 1310 can form at least part of the layers described above in connection with FIG. 12. The processing module 1310 can execute certain instructions and commands to provide wireless or wired communication, using the wired communication subsystem 1320 or a wireless communication subsystem 1330. A skilled artisan will readily appreciate that various other components can also be included in the device 1300.

Figure 14:
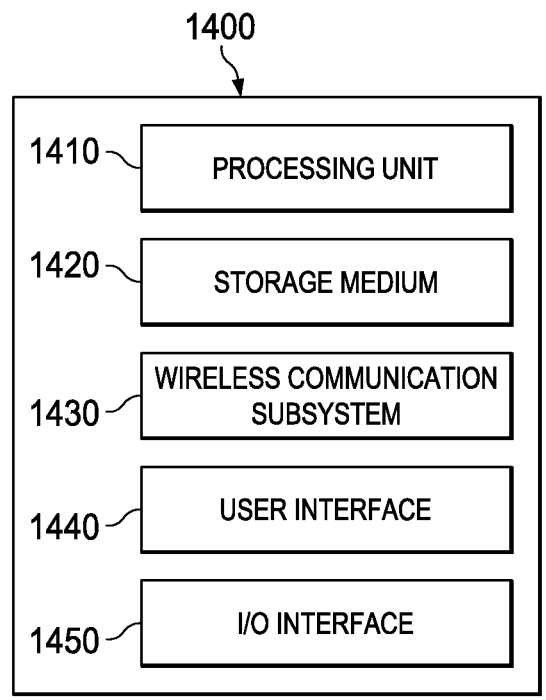
FIG. 14 is a schematic block diagram illustrating a user equipment device according to one embodiment.

Referring to FIG. 14, a user equipment device according to one embodiment will be described below. The illustrated device 1400 includes a processing unit 1410, a computer readable storage medium 1420 (for example, ROM or flash memory), a wireless communication subsystem 1430, a user interface 1440, and an I/O interface 1450.

Similar to the processing module 1310 of FIG. 13, the processing unit 1410 can include a processing component configured to execute instructions related to one or more of the processes, steps, or actions described above in connection with one or more of the embodiments disclosed herein. The processing unit 1410 can also include other auxiliary components, such as random access memory (RAM) and read only memory (ROM). The computer readable storage medium 1420 can store an operating system (OS) of the device 1400 and various other computer executable software programs for performing one or more of the processes, steps, or actions described above.

The wireless communication subsystem 1430 is configured to provide wireless communication for data and/or control information provided by the processing unit 1410. The wireless communication subsystem 1430 can include, for example, one or more antennas, a receiver, a transmitter, a local oscillator, a mixer, and a digital processing (DSP) unit. In some embodiments, the subsystem 1430 can support a multiple input multiple output (MIMO) protocol.

The user interface 1440 can include, for example, a screen or touch screen (for example, a liquid crystal display (LCD), a light emitting display (LED), an organic light emitting display (OLED), a microelectromechanical system (MEMS) display), a keyboard or keypad, a trackball, a speaker, a microphone. The I/O interface 1450 can include, for example, a universal serial bus (USB) interface. A skilled artisan will readily appreciate that various other components can also be included in the device 1400.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the disclosure.

What is claimed is:

1. A method of operating an overlay access node in a wireless communication network including one or more underlay access nodes, the method comprising:
   receiving, by the overlay access node, an indication of at least one power measurement associated with one or more overlay access nodes and the underlay access nodes, wherein the overlay access node is configured to transmit data during one or more almost blank subframes (ABSs);
   selecting, by the overlay access node, at least one user equipment (UE) to communicate with the overlay access node during one or more ABSs, based at least partly on the indication, wherein the at least one UE is in communication with the overlay access node, but not with the underlay access nodes, during the one or more ABSs;
   determining, by the overlay access node, a first power level for communicating with the at least one UE during the one or more ABSs, wherein the first power level is lower than a second power level used during non-ABS subframes; and
   transmitting, by the overlay access node, the data to the at least one UE during the one or more ABSs.

2. The method of claim 1, wherein at least one other UE is in communication with at least one of the underlay access nodes during the one or more ABSs, and wherein the indication of the at least one power measurement is associated with power measurement by the at least one other UE.

3. The method of claim 2, wherein receiving the indication comprises receiving a measurement from at least one of the underlay access nodes via a backhaul link.

4. The method of claim 2, wherein receiving the indication comprises receiving a measurement wirelessly from the at least one other UE.

5. The method of claim 1, wherein receiving the indication comprises receiving a measurement wirelessly from the at least one UE.

6. The method of claim 5, wherein the indication is based at least partly on power measurement by the at least one UE of one or more signals from one or more of the overlay access nodes and the one or more underlay access nodes.

7. The method of claim 6, wherein the indication is based at least partly on a ratio of (1) Reference Signal Received Power (RSRP) measurement of a signal from the overlay access node to (2) RSRP measurement of a signal from one of the underlay access nodes.

8. The method of claim 6, wherein the indication comprises an indicator indicative of proximity of the at least one UE to one or more of the overlay access nodes and the underlay access nodes.

9. The method of claim 1, further comprising communicating, by the overlay access node, data and/or control information with the at least one UE at the first power level.

10. The method of claim 1, wherein determining the first power level comprises using the indication.

11. The method of claim 1, further comprising transmitting, by the overlay access node, signaling to the at least one UE, wherein the signaling is indicative of at least one power ratio of a data signal to a reference signal during the one or more ABS, during one or more non-almost blank subframes (non-ABSs), or during both.

12. The method of claim 11, wherein the power ratio comprises a power ratio of Physical Downlink Shared Channel (PDSCH) Energy per Resource Element (EPRE) to Cell-specific Reference Symbol (CRS) EPRE.

13. The method of claim 11, wherein the ratio is determined based on the first power level.

14. The method of claim 11, further comprising extending a range of values of one or more of parameters ρA and ρB by extending/shifting a UE-specific parameter PA in a PDSCH-Config message defined in 3GPP LTE TS 36.331 release 10 or later.

15. The method of claim 11, wherein transmitting the signaling comprises using radio resource control (RRC) signaling.

16. The method of claim 1, further comprising:
   determining, by the overlay access node, a relative position of the at least one UE; and communicating, by the overlay access node, data and/or control information to the at least one UE during the one or more ABSs, using a directional transmission.

17. The method of claim 1, further comprising transmitting, by the overlay access node, signaling to the at least one UE, wherein the signaling includes at least one parameter indicative of transmission power used for communication during the one or more ABSs.

18. The method of claim 17, further comprising receiving a Channel Quality Index (CQI) measurement modified based at least partly on the at least one parameter.

19. The method of claim 1, wherein the overlay access node comprises a macro evolved Universal Terrestrial Radio Access Network (UTRAN) node B (eNB), and wherein the underlay access nodes comprise a pico eNB.

20. The method of claim 1, wherein the overlay access node is at least part of an aggressor cell, and wherein at least one of the underlay access nodes is at least part of a victim cell.

21. An overlay access node comprising:
  a memory storing computer readable instructions executable by one or more processors, the one or more processors configured to:
  receive an indication of at least one power measurement associated with the overlay access node and/or one or more underlay access nodes;
  select at least one user equipment (UE) to communicate with the overlay access node during one or more almost blank subframes (ABSs), based at least partly on the indication;
  determine a first power level for the overlay access node to communicate with the at least one UE during the one or more ABSs, wherein the first power level is lower than a second power level used during non-ABS subframes; and
  transmit data from the overlay access node to the at least one UE during the one or more ABSs, wherein the at least one UE is not in communication with the underlay access nodes during the one or more ABSs.

* * * * *